United States Patent [19]

Clough et al.

[11] Patent Number: 5,977,979
[45] Date of Patent: Nov. 2, 1999

[54] SIMULATED THREE-DIMENSIONAL DISPLAY USING BIT-MAPPED INFORMATION

[75] Inventors: Scott James Clough, Woodinville; Jesse Dean Jones, Seattle; Tad Martin Wood, Redmond, all of Wash.

[73] Assignee: International Business Machines Corporation, Armonk, N.Y.

[21] Appl. No.: 08/550,854

[22] Filed: Oct. 31, 1995

[51] Int. Cl.⁶ .................................................. G06T 15/00
[52] U.S. Cl. ......................... 345/422; 345/435; 345/439
[58] Field of Search ................................... 345/421, 422, 345/435, 439, 113, 114, 139, 127

[56] References Cited

U.S. PATENT DOCUMENTS

| | | | |
|---|---|---|---|
| Re. 33,662 | 8/1991 | Blair et al. .............................. | 364/410 |
| 4,531,120 | 7/1985 | Brownell, Jr. et al. .................. | 340/723 |
| 4,875,097 | 10/1989 | Jackson ................................ | 345/139 X |
| 5,239,464 | 8/1993 | Blair et al. ............................. | 364/410 |
| 5,295,234 | 3/1994 | Ishida et al. ............................ | 345/421 |

*Primary Examiner*—Mark K. Zimmerman
*Attorney, Agent, or Firm*—Anthony N. Magistrale

[57] ABSTRACT

A computer-controlled display provides a two dimensional simulation of a three dimensional scene while providing for relatively low computing load. Data which is used in determining scaling of figures placed against a background scene and/or used to determine, pixel by pixel, relative occlusion of a figure with respect to features of a scene (or other figures) are largely precalculated and stored so that little or no calculation of these three dimensional characteristics needs to be performed on the fly.

5 Claims, 23 Drawing Sheets

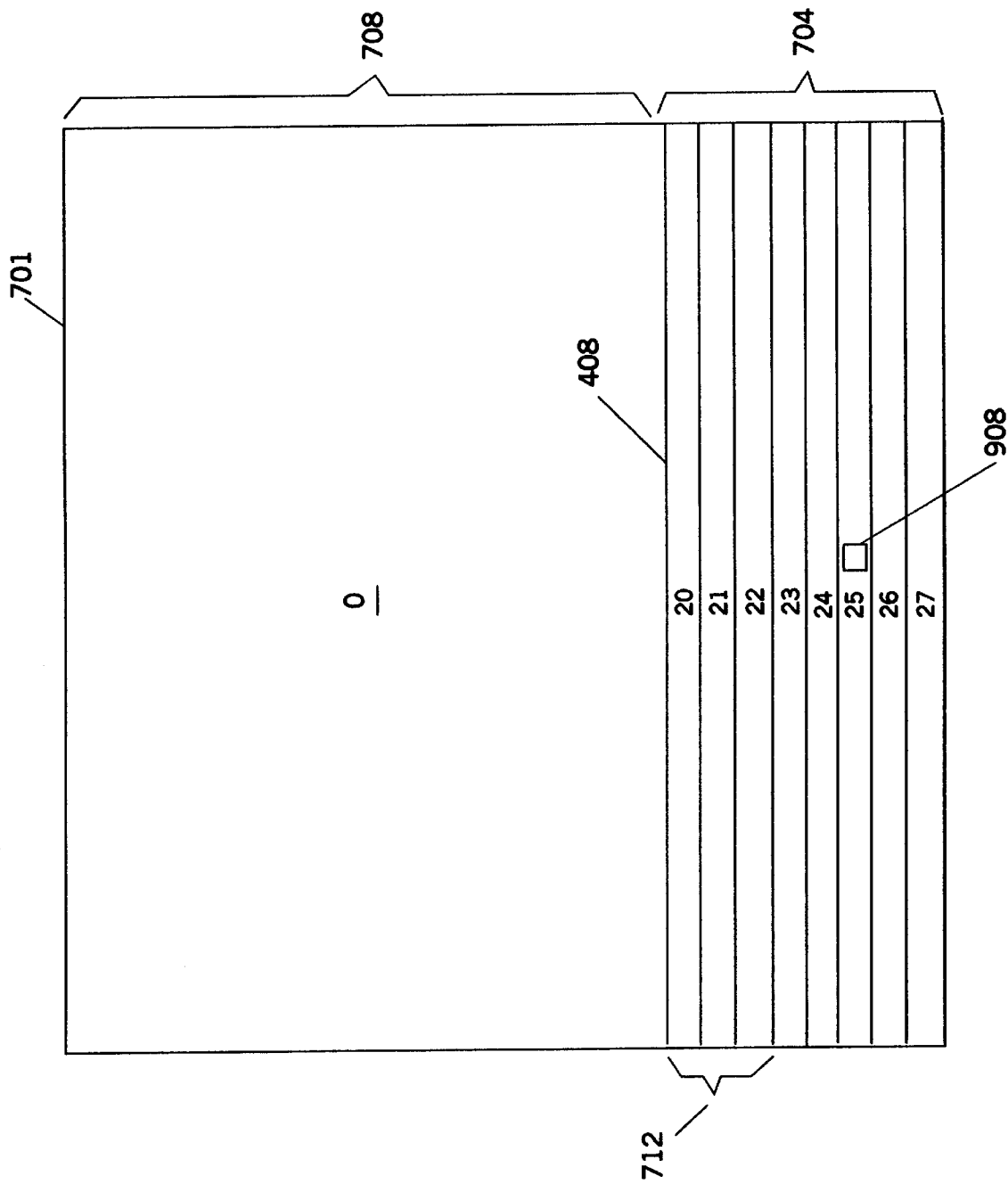

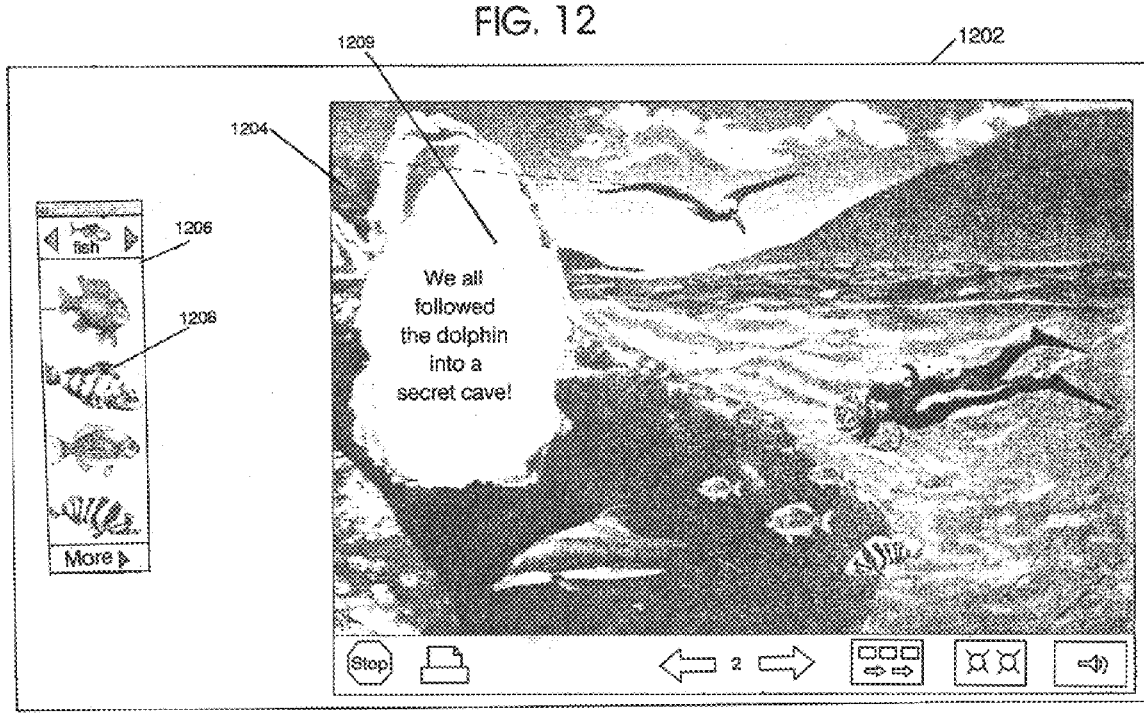

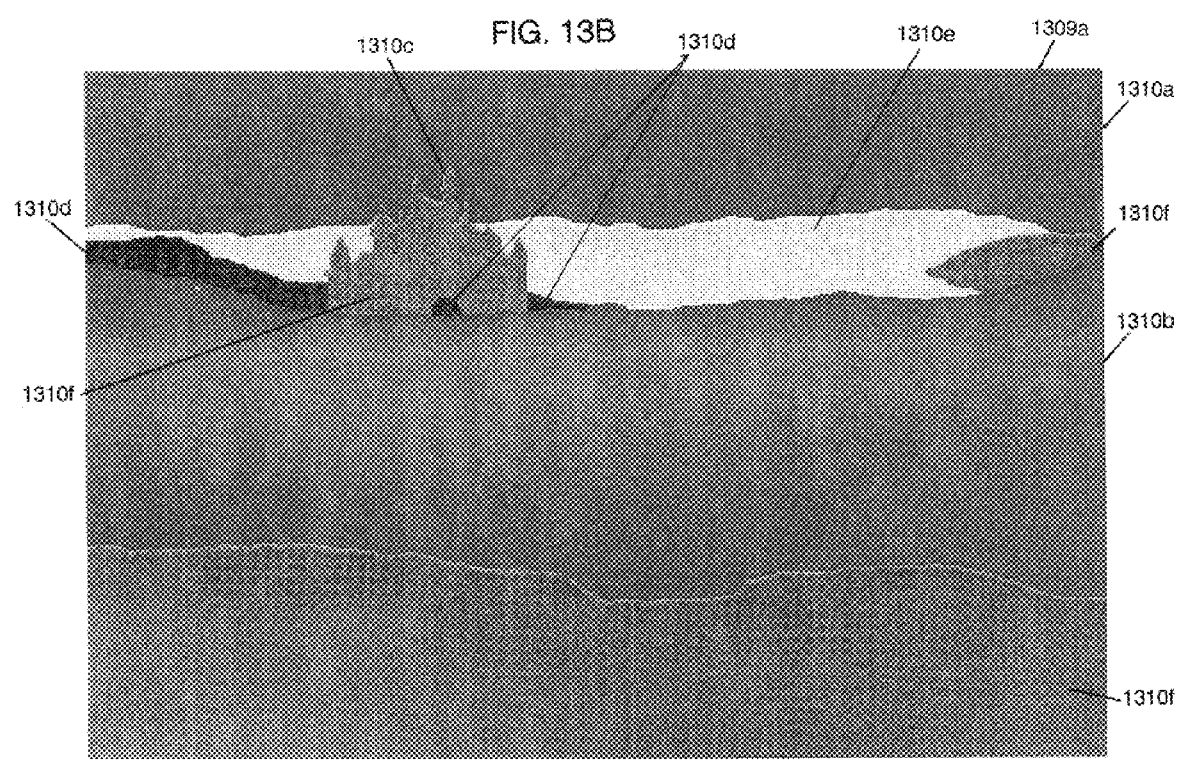

FIG. 13I
FIG. 13J
FIG. 13K
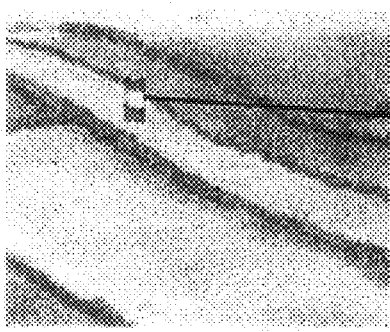

SIMULATED THREE-DIMENSIONAL DISPLAY USING BIT-MAPPED INFORMATION

The present invention relates to a computer controlled or implemented display method and apparatus and in particular to a method and apparatus for displaying images on a screen which simulates certain three-dimensional features such as foreshortening, artifacting and/or interposition without the need for performing fully three-dimensional positional calculations and/or rendering.

BACKGROUND INFORMATION

Computers have been used to implement and control displays of many types of images. In addition to displays of two-dimensional images (such as images of documents, graphs, spreadsheets and the like), it is sometimes desirable to provide a computer-controlled display which presents an image that has certain three-dimensional characteristics. One characteristic associated with three-dimensional scenes is a characteristic whereby, as an object is positioned or moved farther from the intended viewpoint of the viewer, the object appears to become smaller and subtends a smaller region of the overall scene. This characteristic will be referred to herein as "foreshortening." Another characteristic of three-dimensional displays is a characteristic wherein if two objects (or portions thereof) are collinear along a viewer's line of sight, only the closer object is fully visible, with some or all of the farther object along that line of sight being occluded and not visible. This property or characteristic will be referred to herein as "interposition" or "occlusion." Another characteristic of three-dimensional displays is a characteristic wherein a figure will appear to be dimmed in certain positions or environments, such as in the far distance or in fog, mist, or water. This property or characteristic will be referred to herein as "artifacting." Although the following description concentrates on foreshortening, occlusion and artifacting, there are also other characteristics of three-dimensional scenes such as parallax (the difference in appearance of a scene when viewed from the left eye or right eye) and depth queuing.

Some attempts to provide a display having certain three-dimensional characteristics have used fully three-dimensional calculations and/or rendering. For example, in some approaches, a three-dimensional space is modeled, assigning a picture element or pixel to each of a plurality of locations in the modeled three-dimensional space, i.e., pixels having height, width and depth (or X, Y, Z) values. The positions occupied by various objects are indicated by values assigned or associated with each of the three-dimnensional pixels typically stored in a computer memory as a three-dimensional array. FIG. 1 depicts a model of a three-dimensional space which is four pixels in width, three pixels in depth and nine pixels in height. Values may be stored, e.g. in a computer memory, to model such three-dimensional regions and objects. Manners of storing multi-dimensional arrays of data in memory are well-known to those of skill in the computing art. In some fully three-dimensional calculation methods, the three-dimensional objects are represented by one or more shells or polygons, e.g. by storing indications of the location and attitude of a plurality of faces of each modeled polygon. Returning to the example of FIG. 1, the two-dimensional display which will be projected on a display screen will depend upon the intended viewpoint of a user with respect to the modeled three-dimensional space. FIG. 1 depicts one viewpoint of the modeled three-dimensional region. However, if the viewpoint is selected to be that indicated at 12a of FIG. 1, the display will show the image as depicted in FIG. 2, while a viewpoint as indicated at 12b will result in a display showing the image as depicted in FIG. 3.

Various techniques have been used to convert stored three-dimensional mathematically modeled space into a two-dimensional view. In one technique, after selecting a viewpoint, a first two-dimensional image is formed corresponding to the objects which intersect a plane in the three-dimensional modeled space farthest from the viewpoint, followed by successively overdrawing the image with an image of objects (such as faces of polygons) located in planes successively closer to the viewpoint. Other methods of calculating a two-dimensional image to simulate a modeled three-dimensional space have also been used, such as ray-tracing methods. However, many of these methods for providing simulation of a three-dimensional space on a two dimensional display are believed to be computationally demanding and thus tend to execute very slowly unless performed on relatively large and sophisticated (and typically expensive) computers. In particular, some methods result in a computation load which is at least proportional to $X^3$ where X is a measure of the size of the modeled three-dimensional region (such as a major diagonal).

Accordingly, it would be useful to provide a computer implementation for displaying a two-dimensional simulation of a three-dimensional region, preferably with the capability for user movement or manipulation of simulated objects in the three-dimensional region, and preferably including three-dimensional characteristics such as foreshortening, artifacting and/or occlusion while reducing or minimizing the required computations, thus making it feasible to use relatively low-cost computers for such simulation. Preferably the computation load is proportional to $X^n$ where n is less than about 3.

SUMMARY OF THE INVENTION

According to the present invention, three-dimensional features or characteristics such as foreshortening, artifacting or occlusion are provided by storing at least some predetermined foreshortening, artifacting or occlusion factors or other information, preferably in one or more two-dimensional arrays. The size of a figure which is displayed can be varied in accordance with a scaling factor. In one embodiment, when a figure is positioned or moved by a user with respect to a simulated three-dimensional region, a scaling factor is selected for that figure depending on the position selected for said figure by the user. In one embodiment, at least one map of a two-dimensional rendering of the simulated three-dimensional environment is provided. The map (or maps) can be used to assign a scaling factor to the figure as the figure is moved or positioned so that when the fig are is moved to a new location on the two-dimensional rendering, and in which the new location is intended to correspond to or simulate a distance farther from the viewer than the original distance, the maps will yield a smaller scaling factor. In effect, as the user moves the figure to a position intended to be farther away from the viewer, the figure will become smaller, i.e., will subtend a smaller portion of the overall display, thus providing a type of foreshortening.

In one embodiment, occlusion can be provided, either separately from or together with the above-described foreshortening. In one aspect, a distance value is assigned to various regions and/or features of the (two-dimensional rendering of the) three-dimensional environment (and, if desired, to other figures which may have been previously positioned and displayed). A distance value is also assigned to a figure when it is positioned or moved in the simulated three-dimensional environment. When the image is to be displayed, including the newly-moved figure, a comparison is made between the distance value of the newly-moved figure and the distance value of regions or objects in the two-dimensional rendering of the three-dimensional region, at least in the area near the newly-moved figure, such that objects, figures or regions having a distance value which indicates they are closer to the viewer than the newly-moved figure will occlude some or all of the figure.

In one embodiment, two or more distance values may be associated with a given pixel or location of the two-dimensional rendering of the environment. The decision as to which distance value is assigned to a figure located at that pixel will depend upon the direction or location from which the figure approached its final location. This feature is useful in order to permit the user to simulate moving a figure fully or partially behind an object in the environounent, such as moving a figure through a doorway and behind a wall, over and (partially) behind a hill, and the like. In one embodiment, this is achieved by providing two or more maps which may partially overlap one another (considered on a pixel-wise basis). The map which is selected for assigning a distance value to the figure will depend, at least partially, on which map was associated with the figure prior to movement or placement of the figure.

The simulation of three-dimensional scenes on a computer display can be used for a number of purposes. However, it is anticipated that one use of the invention described below will be in connection with learning software, and in particular, software to assist and enhance learning by children in a school and/or home environment, preferably in a manner that is enjoyable to the user. Preferably, such software provides user-responsive, scene-sensitive autosizing and/or other three-dimensional characteristics. It is believed, for example, that software which permits children or other users to position and/or move figures in relation to a simulated three-dimensional environment or scene is useful in enhancing or developing the user's ability to express himself or herself. In one embodiment, simulation of a manipulatable three-dimensional environment can be provided in the context of software which permits the user to create written narration, accompanying and/or inspired by the display, to assist, enhance or encourage the writing or stories, poetry, reports, etc., production of interactive electronic or printed books, creation of works of art, multimedia works, such as those combining text, art, animnation, sound effects and/or music. It is believed that, in many situations, the persons who are believed most likely to receive the greatest benefit from software of this type, namely children, have access to only medium- or low-level computers. Thus, the present invention which permits a simulation of a three-dimensional environment without imposing a large computing load is practical for implementation and use by the persons most likely to benefit from the invention. In contrast, applications which simulate three-dimensional environrnents by a more computationally-intensive method such as three-dimensional computation and/or rendering as described above, may place this resource beyond the financial and/or computational reach of those most likely to benefit from the invention.

BRIEF DESCRIPTION OF THE DRAWINGS

FIG. 2 is a two-dimensional view of the region of FIG. 1 from the viewpoint depicted at 12a;

FIGS. 7B, 7C and 7D depict scale factor maps associated with the display of FIG. 5 for use in accordance with an embodiment of the present invention;

FIG. 12 depicts scanned images of the appearance of a computer screen controlled in accordance with a procedure according to an embodiment of the present invention.

DETAILED DESCRIPTION OF THE PREFERRED EMBODIMENTS

In one embodiment of the invention, the reduction in computational load previously associated with simulations of three-dimensional environments is attributable, at least in part, to eliminating the need for performing calculations or renderings based on three-dimensional arrays of information and/or storing three-dimensional arrays of pixels or other three-dimensional arrays of information. Another feature which contributes to the reduction of computing load is that many of the factors used for scaling, occlusion and the like are pre-calculated and stored as maps and tables rather than requiring items to be calculated "on the fly". Thus, providing for proper scaling and occlusion uses a look-up procedure in stored tables in favor of performance of calculations.

Figure 4:
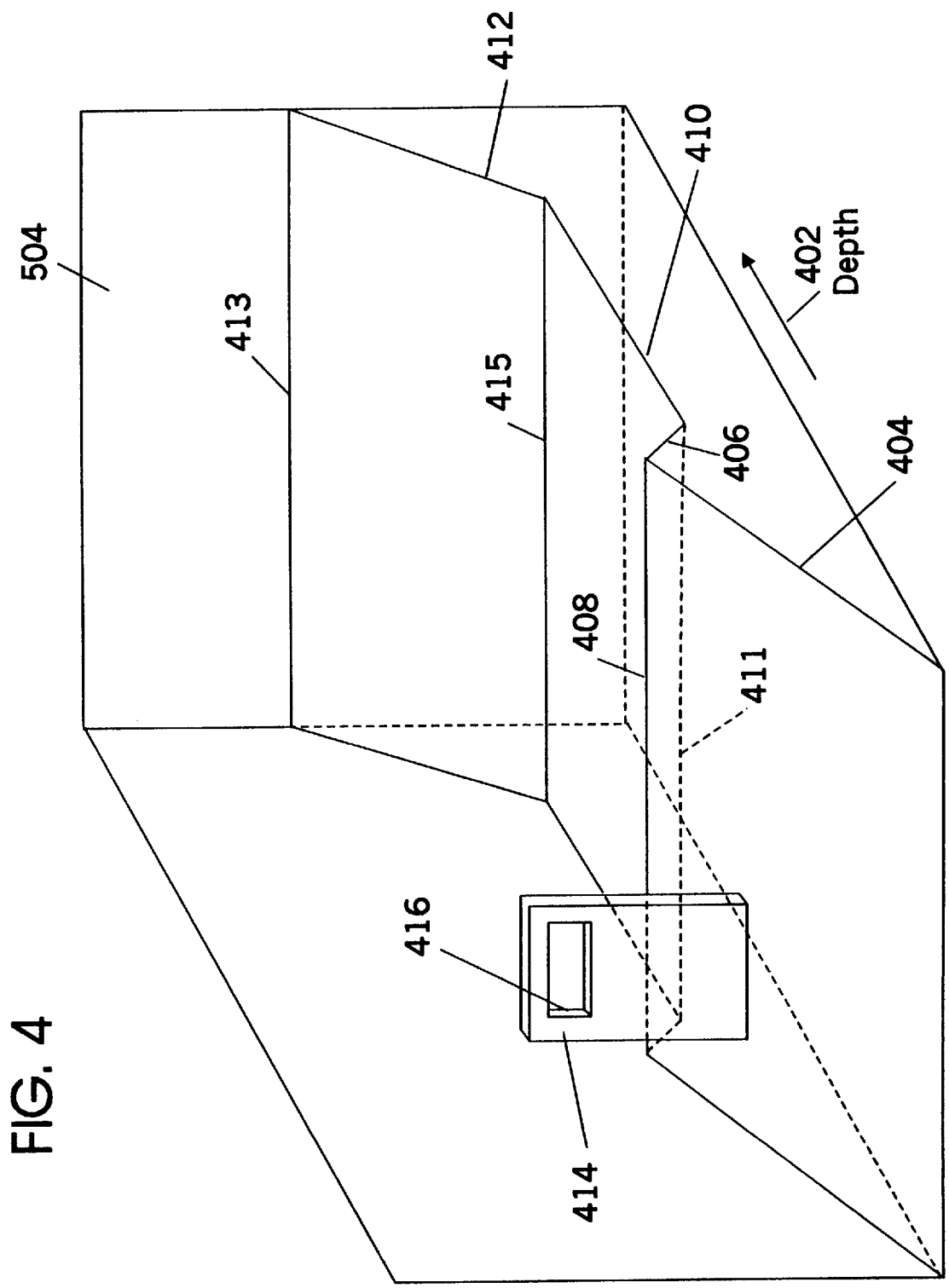
FIG. 4 is a perspective depiction of a conceptual three-dimensional space to be simulated.

According to the present invention, one or more two dimensional arrays of information or "maps" are provided which are used for controlling a two-dimensional display in such a way as to simulate certain three-dimensional characteristics. In the following discussion, three simplified examples illustrating features of the present invention will be provided, followed by a more realistic example. In the examples described below, a digitized (pixelated) background scene is created and stored in memory. Although the term "background" will be used herein to identify this digitized two-dimensional scene, as will be described below, in some situations portions of the background will occlude all or portions of a figure so that, in such situations, those portions of the background will in fact be "foreground" with respect to portions of the figure. Typically, the background scene will be a two-dimensional rendering of a three-dimensional scene, somewhat in the nature of a landscape painting. Typically, the background will be created so as to depict some three-dimensional landscape or scene which the creator has in mind. FIG. 4 illustrates such a three-dimensional scene. However, it should be emphasized that the present invention does not require storage, in the computer, of the three-dimensional region. The three-dimensional scene of FIG. 4 may exist only in an artist's mind (although one could store data representing a three-dimensional scene on a computer if desired, e.g. to assist the artist in creating the two-dimensional background). In the example of FIG. 4, the three-dimensional scene, described in order of increasing depth 402 includes a relatively steep slope upward 404 followed by a steep slope downward 406 to define a ridge 408 followed by a relatively shallow upward slope 410 and a very steep upward slope 412, e.g. to simulate, e.g., a mountain range. The boundary 411 between region 406 and region 410, not visible in the perspective of FIG. 4, is shown in phantom. A boundary 413 is formed between the mountain range 412 and the sky 504. Also depicted in the example of FIG. 4 is a free-standing door 414, 416 positioned part way up the first slope 404.

Figure 5:
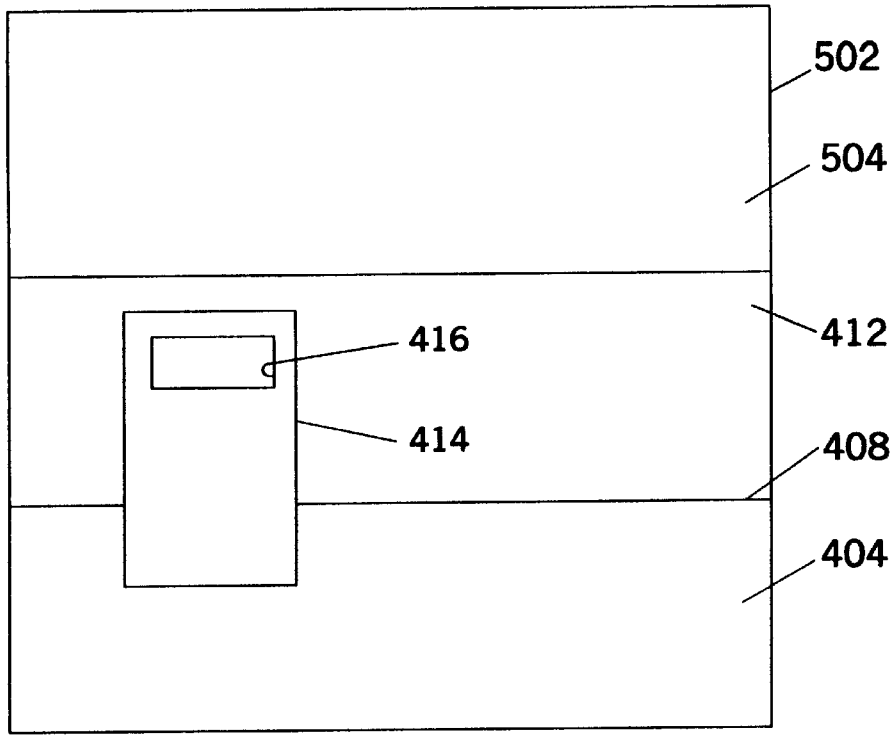
FIG. 5 is a front elevational view of a display showing a two-dimensional projection of the three-dimensional region of FIG. 4.

FIG. 5 depicts a background scene corresponding to the conceptual three-dimensional region of FIG. 4. As seen in FIG. 5, the two-dimensional background 502 contains the features from the conceptual three-dimensional scene including the initial slope 404, the ridge 408, the mountain range 412 and the door 414 with a window 416. The region 504 above the mountain range 412 may be depicted, e.g. as sky. In the view of FIG. 5, the downward slope 406 and slightly rising slope 410 are not visible since they are hidden behind the ridge 408. The digitized background 502 can be created in any of a number of fashions. In one embodiment, original pen and ink or similar artwork is created and the artwork is processed by a color scanner to produce a two-dimensional array of pixels, each having a value indicating the color to be used for that pixel. A background 502 could also be produced electronically by any graphic or drawing programs. In one embodiment, an initial image is which has a width of 800 pixels and a height of 540 pixels, each pixel having a value associated with one of $2^{24}$ (about 17,000,000) colors. From this image the background image 502 is produced, having 800×540 pixels, each associated with one of 256 colors. Thus about 432,000 will suffice to store the color data for the background image 502. This data can be stored in any of a number of well-known graphic file data storage formats including PCX (Microsoft® paint graphics format) and is preferably stored in a compressed or packed format as will be understood by those skilled in the art. In addition to the background graphic 502, data is stored to indicate appropriate scaling factors to be applied at different locations with respect to the background. This data can be stored in any of a number of fashions. In one embodiment, one or more scaling factors is stored for each pixel of the background. This embodiment will be described more thoroughly below. Other ways for storing indications of scaling factors could include storing a list of various regions of the background (defined, e.g., by the vertices thereof and/or other indications of boundaries of regions) such as the upward sloping region 404, mountain range region 412, sky region 504, door region 414 and window region 416. It would be possible to then store an indication of values which can be used to calculate a scaling factor for any location within said regions such as storing a set of equations to define a scaling factor as a function of pixel location within each region. This approach, however would require "on the fly" calculations. Therefore, it is considered generally preferable to store scaling factors for each pixel which can be looked up without performing calculations. Scaling information for each pixel can be stored in a number of fashions. In one embodiment, one or more two-dimensional maps of the background figure 502 could be provided. For example, in some situations, it would be possible to provide a two-dimensional array of 800 by 540 pixels where the value of each pixel, rather than indicating a color, indicates a scaling factor. The use of a scaling factor will be described more thoroughly below. In one embodiment, scaling factors in the range of 0–255 can be used and in this fashion at two-dimensional map can be created and/or stored in the same fashion as a color graphic image having any of 256 possible colors. Such a scheme is useful since there are many well-known formats and tools for generating, storing and/or compressing and decompressing data for images of this type.

Although it would be possible to provide a single scaling factor map for each background 502, in some cases it is desirable to provide for two or more scaling factors for each location. This feature becomes desirable in contexts where occlusion is desired and thus is not necessary e.g. in a situation where only scaling (and not occlusion by background features) is to be provided. One way of providing two or more scaling factors associated with a given pixel is to provide two or more scaling factor maps for a given background 502. In a typical situation, maps would contain valid scaling factors for only some of the 800 by 540 pixels (typically corresponding to certain regions of the background 502). Typically, at least a part of a valid region of one map will overlap at least part of a valid region of a second map. In one embodiment, a special value (e.g., zero) is stored for those pixels of a map which are invalid (to be used, e.g. as described below).

Figure 6:
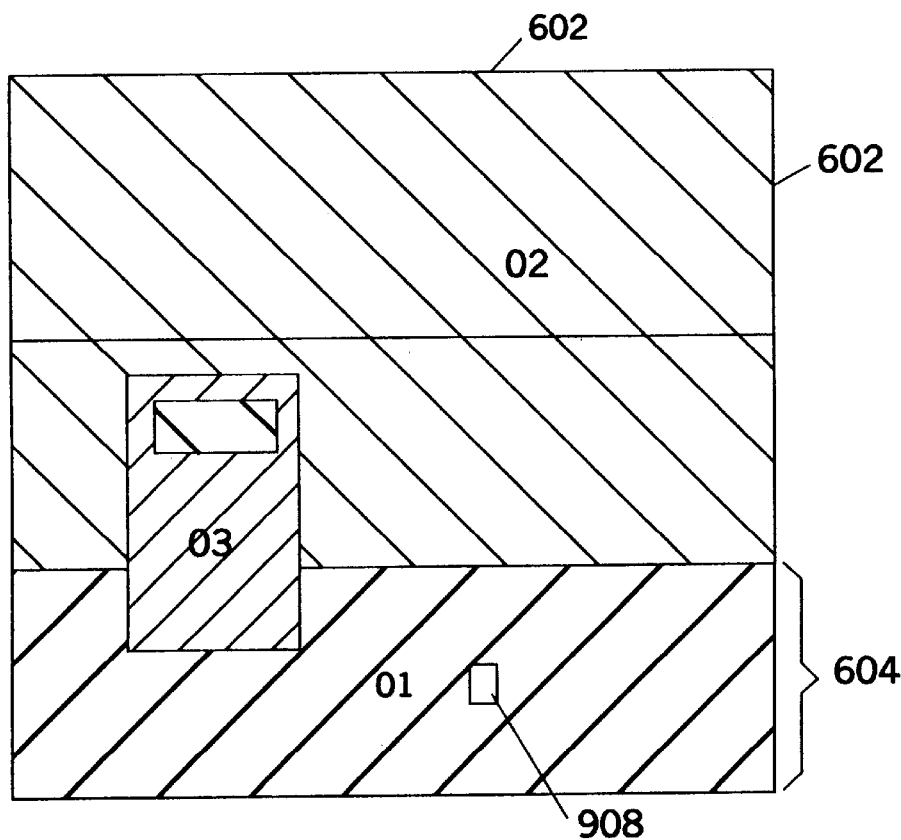
FIG. 6 depicts an index map of the display of FIG. 5 for use in accordance with an embodiment of the present invention.

When two or more scaling factor maps are provided, preferably a third "index" map is provided which is used to determine which of the two or more scaling factor maps to use initially. FIG. 6 depicts an index map corresponding to the background 502 which defines one of three values corresponding to each pixel of the background. In this example, the index map 602 assigns a value of 01 to all pixels in the initial slope region 404 of the background map 502, assigns a value of 03 to all pixels on the surface of the door 414 and assigns a value of 02 to all other pixels.

Figure 1:
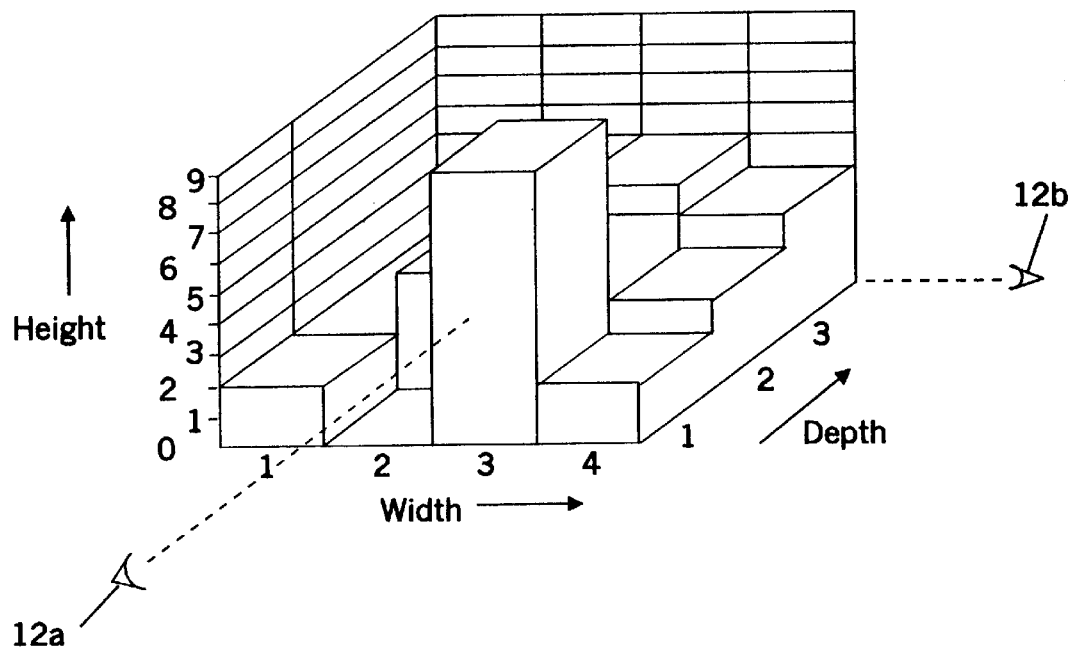
FIG. 1 is a perspective view of a populated three-dimensional region.
Figure 2:
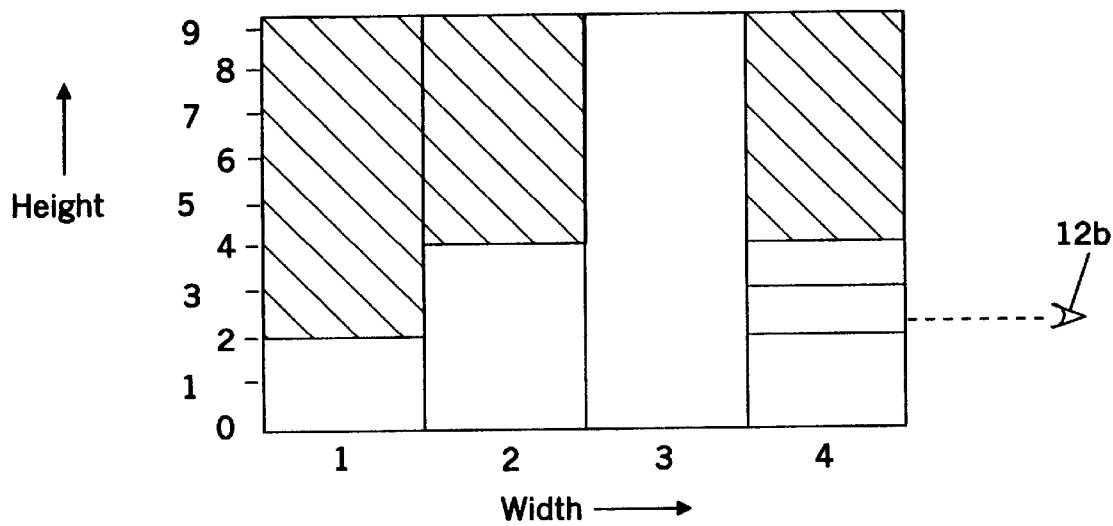
Figure 3:
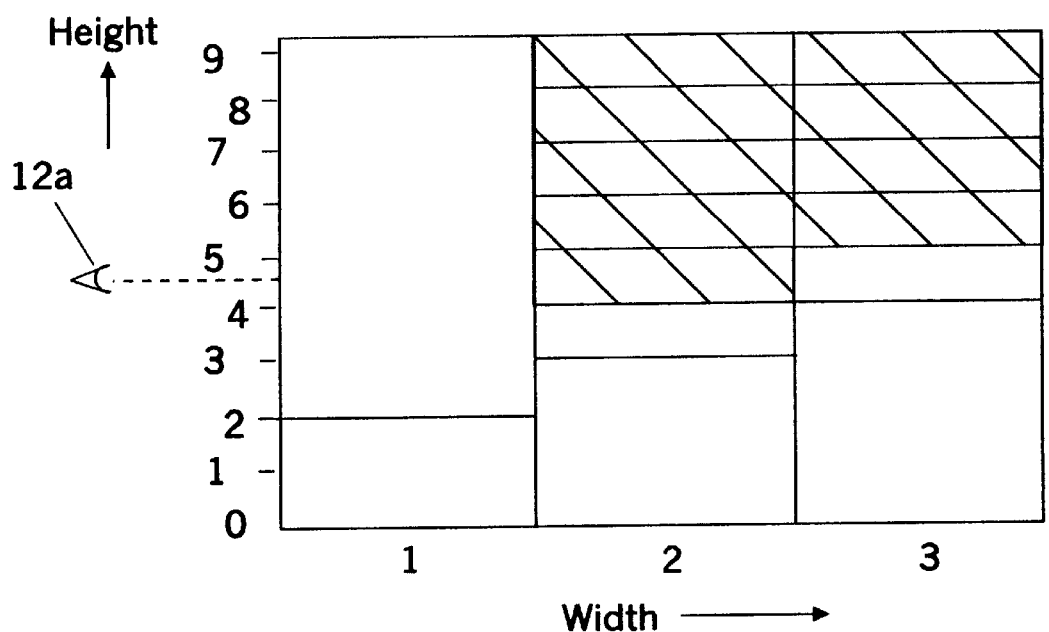
FIG. 3 is a two-dimensional view of the three-dimensional region of FIG. 1 from the viewpoint shown at 12b.
Figure 7D:
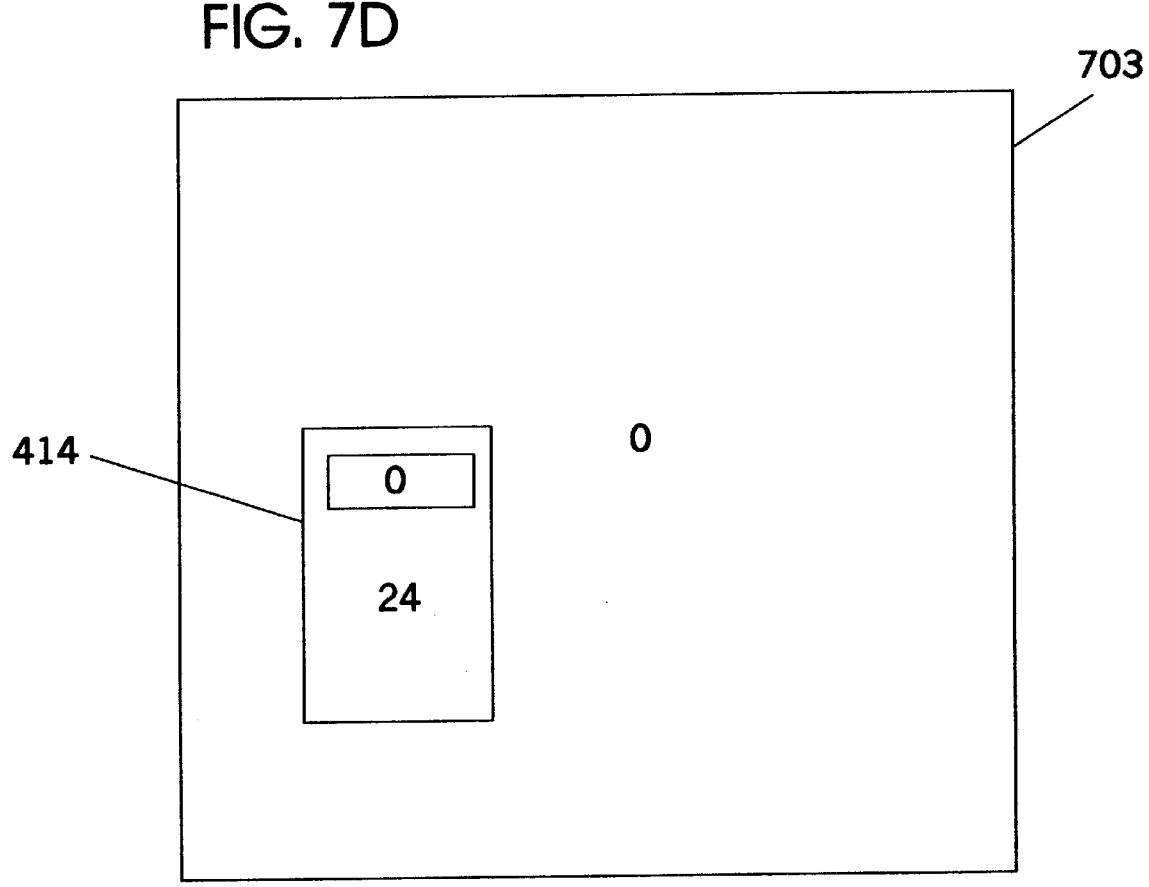
Figure 7A:
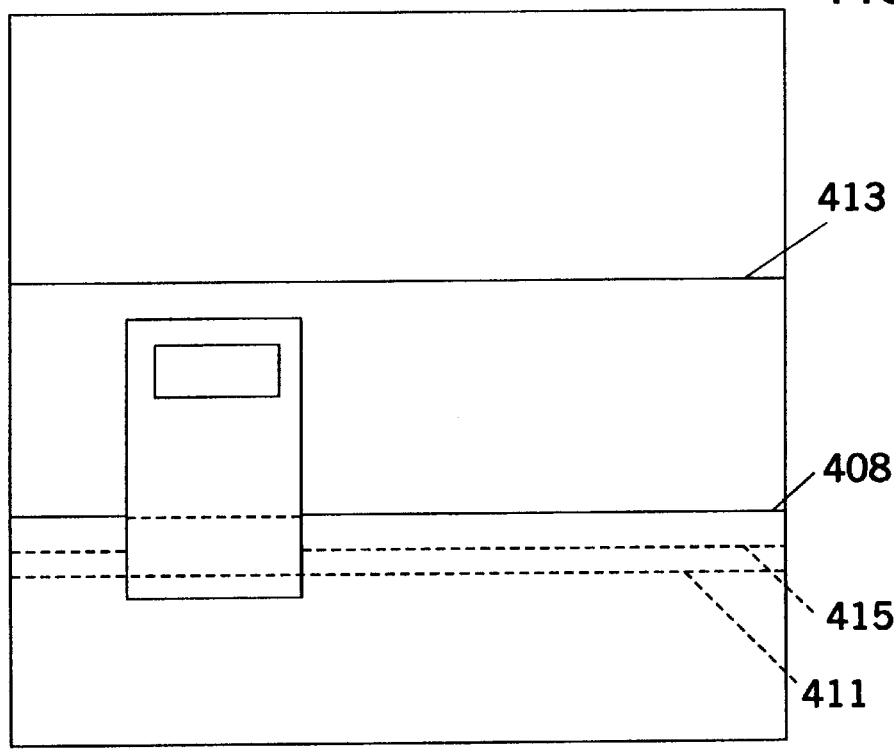
FIG. 7A is a view similar to that of FIG. 5 but showing the location of the projection of various hidden surface boundaries.

FIG. 7A depicts the regions shown in FIG. 5 but also shows hidden boundaries between regions which are not visible in the view of FIG. 5. FIG. 7A is provided in order to better understand the scaling factor maps depicted in FIGS. 7B and 7C but is not itself a map which is stored in memory and is provided only for explanatory purposes.

FIG. 7B depicts scaling factor map number 01. In general, a separate gradient or scaling factor map (or portion thereof) is provided for each part of the scene which a figure can move behind. Thus, referring to FIG. 4, if it is desired to simulate a situation in which a figure can move up the slope 404 and behind (partially) the ridge 408, a first scaling factor map 701 (FIG. 7B) is provided to define scaling factors in the initial slope region 404 and a second scaling factor map 702 (FIG. 7C) is provided to define scaling factors in the region 706 which is above the boundary line 411. A special value (in the present embodiment, a value of 0) is assigned to those pixels, in each map, which do not have a valid scaling factor associated therewith. A portion 710, 172 of each map 701, 702 assigns scaling factors to the same pixels so that the scaling factor which will be used will depend upon which scaling factor map is currently active.

Figure 7C:
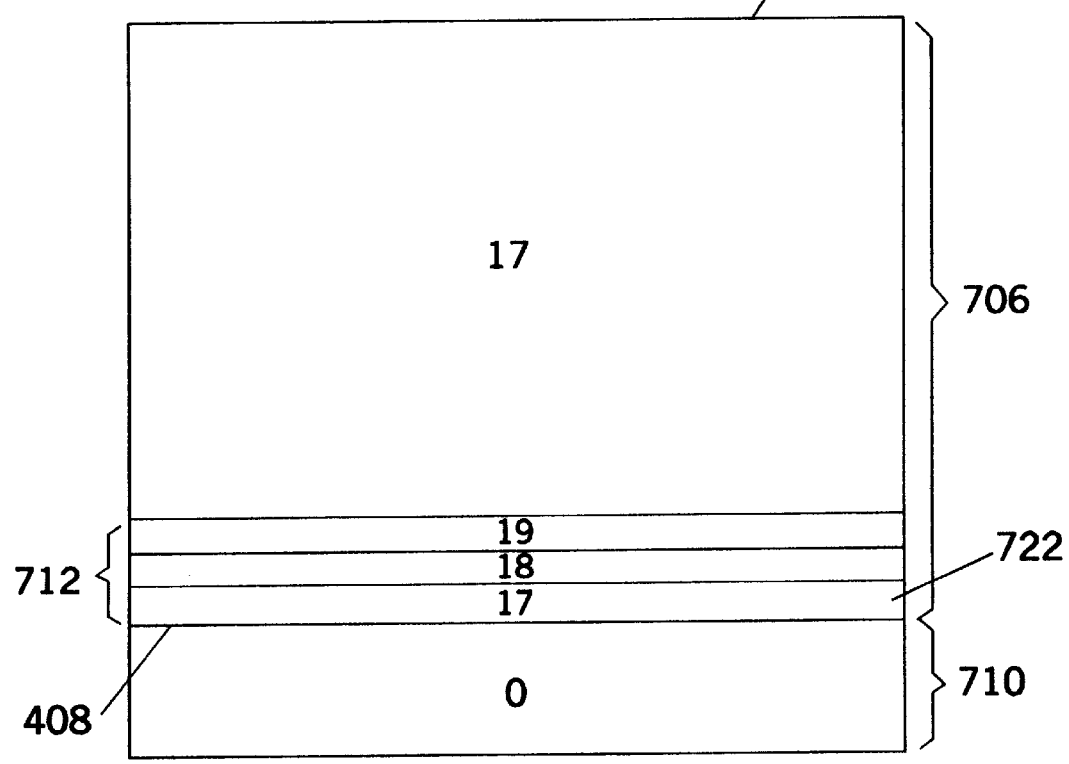

Returning to FIG. 4, it is also desired to simulate movement of a figure either in front of or behind a free-standing door 414. To accommodate this possibility, a third scaling factor map 703 is provided. In this map, a scaling factor (in this case a factor of 25) is provided for those pixels corresponding to the region of the door 414 (excluding the window 416) and the remaining pixels are assigned a value of 0, indicating no valid scaling factor for this region of this map. In one embodiment, each of the maps 701, 702, 703 contain 800 by 540 pixels, each pixel. having a value of between 0 and 255 and thus these maps can be stored and, if desired, compressed in graphic file formats as discussed above in connection with the index map (FIG. 6). In the lower region 704 of the first map 701 it is generally desired for figures to appear to grow smaller as they move from the bottom of this region towards the top of this region (which would correspond to movement up slope 404 of the conceptual three-dimensional area of FIG. 4). Accordingly, larger scaling factors are assigned to the pixels in the lower portions of this region and smaller scaling factors in the upper portions. In FIGS. 7B, 7C and 7D, the scaling factors which are associated with various pixels are indicated by numerals on various regions of the depicted maps. In scaling factor map 702, it is desired to have a relatively small scaling factor in the region 722 corresponding to the rearward slope 410 and the mountain range and sky regions 412, 505 while there are somewhat larger scaling factors provided for the (closer) downward sloping region 406. In the third scaling factor map 703, the region of the door 414 is assigned a scaling factor value consistent with the scaling factor of the slope region 404 in the vicinity of its contact with the lower edge of the door 414. Although, in this example, the scaling (and distance factor) contour line depicted in this example are all parallel with the upper and lower edges of the map, this is only because the present simplified model includes only simple planes. In a more realistic example (such as that described below in connection with FIGS. 13A–P) the boundaries and the maps may have any complex shape as may be needed to provide the required behavior.

Figure 8:
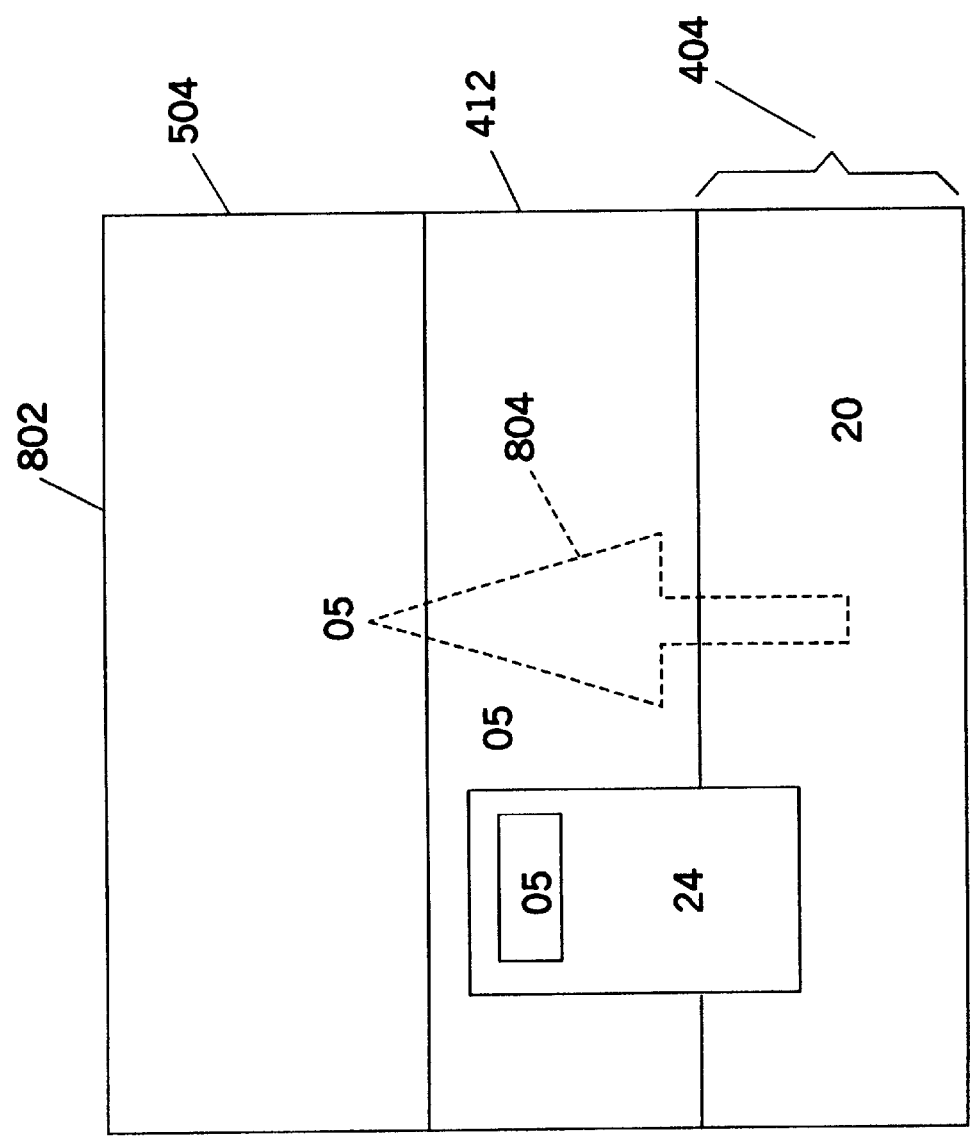
FIG. 8 depicts an occlusion map corresponding to the display of FIG. 5 for use in an embodiment of the present invention.

FIG. 8 depicts an occlusion map as it would be provided prior to placement or movement of any figure on the background. In this state, the visible map 802 assigns distance values to various regions. In general, a distance value assigned to a region which is intended to represent (or act as though) it resides in a plane perpendicular to the view line of the viewer, such as the door region 414 will be assigned a value consistent with the scaling factor value for that object. Regions which are intended to be in the far distance and thus would be substantially never occluded by a figure, such as the mountain range region 412 or the sky region 504 will be assigned small values such as, in this example, 05. A small value is assigned because, in the present example, if two items are in the same line of sight, the item with the larger distance value will be depicted. As will be clear to those of skill in the art, other orders of priority can be used such as using small values to indicate items which are more in the foreground and thus should be depicted in favor of items with lower distance values. Regions which represent a range of distances, such as slope 404, will preferably be assigned a distance value which is about equal to the smallest scaling factor which is assigned to this region in its scaling factor map. Thus, in the example of FIG. 8, the slope region 404 is assigned a value of 20 which is equal to the smallest scaling factor value of region 704. In one embodiment, the occlusion map 802 defines distance values for each of 800 by 540 pixels, preferably in the range between 0 and 255 and thus can be stored as a graphic file format, as discussed above.

Special values may need to be assigned to the occlusion map in order to achieve the desired behavior for certain backgrounds. For example, in a background which shows a room with side walls tapering toward the center, if the side walls are provided with scaling factor values which decrease with distance, as would normally be the case, and one is to position, e.g. a picture frame figure against one of the walls, since the picture frame figure will normally have a single value over its entire surface, when positioned against the wall, it will be partially occluded, appearing to the user to be partially stuck into the wall. Therefore, in this situation the occlusion value for the wall should be set to a small value so that figures will always appear on top of the walls and not partially embedded therein.

According to one embodiment, the process provides a display which includes the three-dimensional characteristic of artifacting. In general, artifacting includes displaying a figure in a fashion such that the figure will appear to be dimmed or darkened when the figure is in certain positions, or in certain relation to other figures or features. In some contexts, it is desired to make figures which are intended to be located a great distance from the viewer appear dimmed. In some contexts it is desired to make figures which are intended to be positioned in the viewer's peripheral vision (i.e. spaced from the main point of interest of the image) appear dimmed. In some contexts, it is desired to provide portions of the background which will appear to be semi-transparent, such as to simulate water, fog, mist, window glass and the like and to make figures which are intended to be behind or within such portions of the background appear dimmed. According to one approach, this is achieved by providing spatial dithering of the values of the occlusion map for this portion of the background. By assigning a relatively high value to a certain portion of the pixels in these regions, such as every other pixel in a checkerboard fashion, when a figure is moved in this region, half the pixels of the background will be positioned to occlude the figure, while the other half will be occluded by the figure, giving an illusion of semi-transparency of portions of the environment and/or dimming of a figure in such a region.

Figure 9:
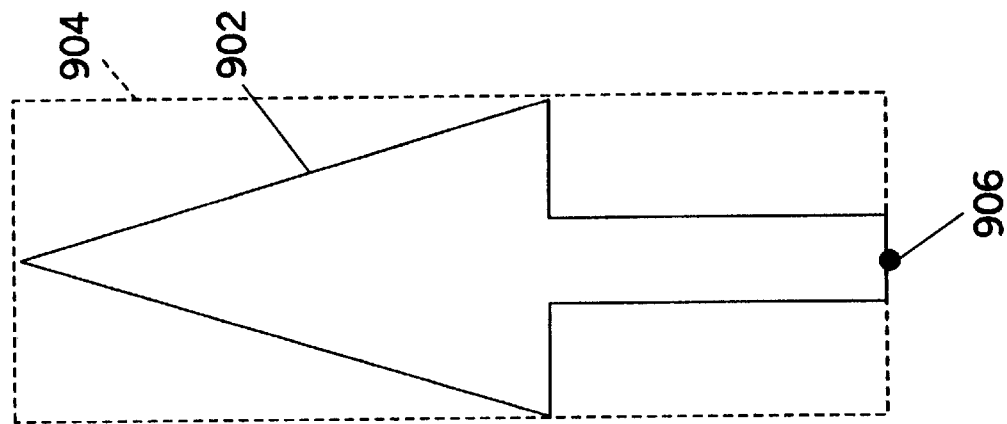
FIG. 9 depicts an example of a figure for manipulation by a user over the display of FIG. 5 in a fashion to simulate three-dimensional areas according to an embodiment of the present invention.

In order to depict or simulate figures moving through the environment of FIG. 4, digitized images of various figures are stored. For purposes of illustration, FIG. 9 depicts a stylized tree 902 which can be stored by dividing the image of the tree and a surrounding region such as that defined by bounding box 904, into a plurality of pixels and storing a color value for each pixel.

As will be clear from the following discussion, at any given time, it is useful to associate the position of the figure with respect to the background 502 with a single pixel of the background. Accordingly, in one embodiment, one pixel 906 of the figure image 902 is designated as the position pixel. Any pixel on the image 902 (or, if desired, a defined distance and direction away from the image 902) can function as the position pixel. Typically, the position pixel 906 will be near the bottom center of the image 902, since many figures are intended to depict persons or other objects that would contact or interact with the background at the bottom of the figure. For example, its depicted in FIG. 9, a tree figure should be depicted as if it were positioned at a distance from the viewer which is related to where the bottom of the trunk of the tree contacts the ground. Other figures may have the position pixel located elsewhere such as near the top of the figure (e.g. a figure depicting a sleeping bat), or near the figure's centroid.

In operation, the computer will be configured to display, initially, all or a portion of the background 502 and one or more figures 902. The user will use a pointing device such as a mouse, trackball, light pen, joystick or the like, to provide user input indicating a desire to move a figure 902 to a location within the conceptual three-dimensional space (FIG. 4). For example, the user may use a mouse to "drag" the image 902 on to the background 502. The manner of controlling a computer display to superimpose one image over another in response to user input is well-lalown to those of skill in the art. As the figure 902 is moved across the background 502, it is possible to identify 1102 the X,Y coordinates of the pixel 908 occupied by the position pixel 906 of the figure 902. The computer then determines the value for the pixel 908 in the index map 602 having those X,Y coordinates. In this example, the figure's position pixel 906 is located by the user over a pixel which, in the corresponding index map 602, lies in a region 604 whose pixels have a value 01. As noted above, this is an indication of which scaling factor map to use. In this example, a value of 01 is an indication to use map 701 to obtain scaling factors. Accordingly, the computer obtains 1106 the value for pixel 908, stored in the first scaling factor map 701, in this case a value of 25 as seen in FIG. 7B. It is then determined 1108 whether the value obtained as the scaling factor is equal to 0. As noted above, a value of 0 indicates an invalid scaling factor on this map and thus is an indication that a different map should be selected. The "yes" branch of this decision 1110 will not occur on the first loop through this procedure. However, as noted below, as the figure is moved across the background or repositioned, it is possible to move the figure into a region where, for the currently used index map, the value is 0. Because of the entry point of loop 112, checking against the index map (1104) is not necessarily performed every time figures are moved or positioned at a different pexel.

If the scaling factor is non-zero, the figure 902 is scaled according to the scaling factor. In one embodiment, a new figure is drawn which has a size that is approximately X/256 times the full size of the stored figure 902, where X is equal to the scaling factor. Preferably, this scaled figure is initially created only electronically, i.e. the data needed to display the figure in the new size is calculated and stored but that scaled figure is not drawn onto the screen until a later step as described below. Scaling of the figure can be performed in a number of fashions. In one embodiment, at least two scaling methods are used depending on a situation. A fast scaling method is used if the mouse button (or other pointer indicator) is being held down, indicating a likelihood that the figure will be further moved or is in the process of being moved, and a slower, more accurate and visually aesthetic scaling method is used if the user has released the mouse button indicating a likely desire to position the figure at its location for some period of time. Thus the fast scaling method is typically used while the user is dragging or repositioning the figure, during which process, there is relatively little time in which to scale the figure since the user may be moving the figure from pixel to pixel at a rapid rate. In one embodiment, the fast drawing method includes dropping out a certain number of pixels in order to reduce the size of the image. For example, when the scaling factor is about 190, the scaling ratio (190/256) is approximately equal to 0.75 and thus the figure 902 can be scaled by drawing a new figure, dropping out every fourth pixel in each line and dropping every fourth line of the image. A more accurate and slower scaling method will include selecting colors for pixels based on the average of pixels in the same vicinity (rather than merely dropping out pixels) and/or line smoothing routines, well-known to those of skill in the art.

After the scaled figure data is produced, the occlusion map 802 is used to determine whether the figure (or a portion thereof) occludes the background (or a portion thereof) or vice versa. In one embodiment this is done on a pixel-by-pixel basis. For each pixel in the figure 902, a comparison is made between the scaling factor value which is assigned to the figure (in this case, a value of 25, as noted above) and the value of the corresponding pixel of the occlusion map 802. In FIG. 8, phantom lines 804 have been drawn to show the region of the occlusion map 802 where a pixel-by-pixel comparison with the scaled figure is to take place. In this case, the relevant portions of the occlusion map 802 have values of 20 or 5. Since the distance value of the figure 902 has been determined to be 25 and since, for each pixel, the figure pixel will occlude the corresponding background pixel if, and only if, the figure pixel has a distance value higher than the corresponding background pixel, in this case the scaled figure 902 will completely occlude the corresponding portion of the background 1114. Since the proper scaling for the figure 902 is now known and, for each pixel, it is known whether the figure 902 occludes the background or vice versa, the scene 502 can be redrawn with the figure 902 added, properly scaled and with the desired occlusion to simulate three-dimensional behavior, even though no three-dimensional pixel array or mathematical model has been stored, calculated or rendered, thus reducing computational load compared with certain previous methods.

Figure 11:
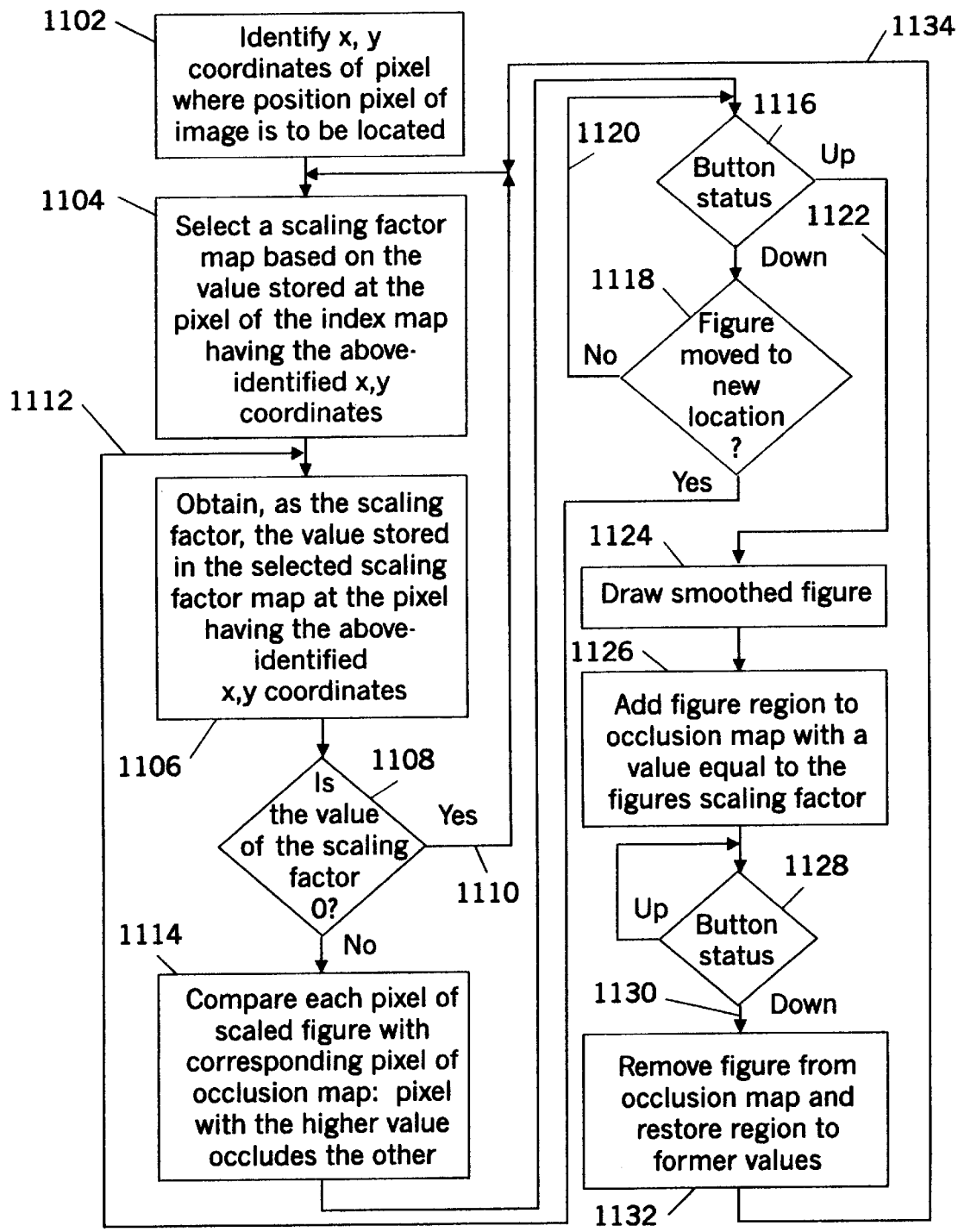
FIG. 11 is a flow chart depicting a procedure for providing a display having foreshortening and occlusion according to an embodiment of the present invention.

In the procedure of FIG. 11, the computer then checks the status of the mouse button (or similar user input). If the mouse button is still in a down position, the computer determines whether the pointer has been moved to a new location 1118 indicating the user still wishes to continue moving the figure 902 and the procedure will then loop 1112 to obtain a new scaling factor 1106 as described above. If the mouse button is still down but there has not yet been any further movement, the procedure will loop 1122 and continue to monitor for a change in the button status or movement to a new location. If the user releases the button 1122, the figure 902 will be positioned, at least for a period of time, at the indicated position 908 and thus a more smooth rendering of the figure 1124 can be calculated if desired. Once the user has indicated a desire to position the figure 902 at the indicated location for a period of time, such as by releasing the mouse button, the figure 902 is added to the occlusion map 802 such as by defining a new region (e.g. that indicated by phantom line 804) with all the pixels within that region 804 having a distance value equal to the scaling factor value defined for the figure 902 (in this case, a value of 25, as noted above). The figure is added to the occlusion map 802 because, in this embodiment, it is desired that figures should be permitted to occlude on another (depending on the intended or simulated distance from the viewer) in order to simulate three-dimensional interaction between figures (as described below) as well as between a given figure and elements of the environment.

Thus, it is seen that in the described embodiment, the scaling factor value plays two roles, a role in providing foreshortening scaling and also a role in providing occlusion. Although it would be possible to use two separate systems and, if desired, two separate sets of values for these two purposes, using a single value for both purposes reduces the amount of data storage necessary and is believed to make for more rapid calculation 1126.

After the figure 902 is added to the occlusion map 802 the button status is monitored 1128. If it is determined that the button is depressed 1130 while the pointer is pointing to a figure, that figure is then removed from the occlusion map 1132. This is so that the occlusion map 802 will always reflect the current status and position of all figures which are positioned (not currently being moved) over the background. When a figure is removed from the occlusion map 802, the region formerly occupied by the removed figure is preferably restored to its original value (i.e., the value which that region had before the figure was added to that region of the occlusion map). In one embodiment, the filling in of this region with the previous values is facilitated by storing another map, containing such original values. In general, this restoration map will be substantially similar to the occlusion map in the form the occlusion map had before any figures were added to the occlusion map. Although it is preferred, in order to achieve the desired execution speed, to restore values based on a pre-stored restoration map, it is also possible, at least in some situations, to regenerate values needed from the various scaling factor maps since, in general, the restoration values will be substantially similar to the scaling factors corresponding to (only) visible surfaces. It is noted, however that some effects, such as artifacting, as described above, require providing special occlusion values (such as spatially dithered values), and that it may be difficult or impossible to provide such special values by generating values based on, e.g. scaling factor maps. After removing the figure from the occlusion map 1132, the procedures loops 1134 to select a scaling factor map 1104 as described above.

Figure 10A:
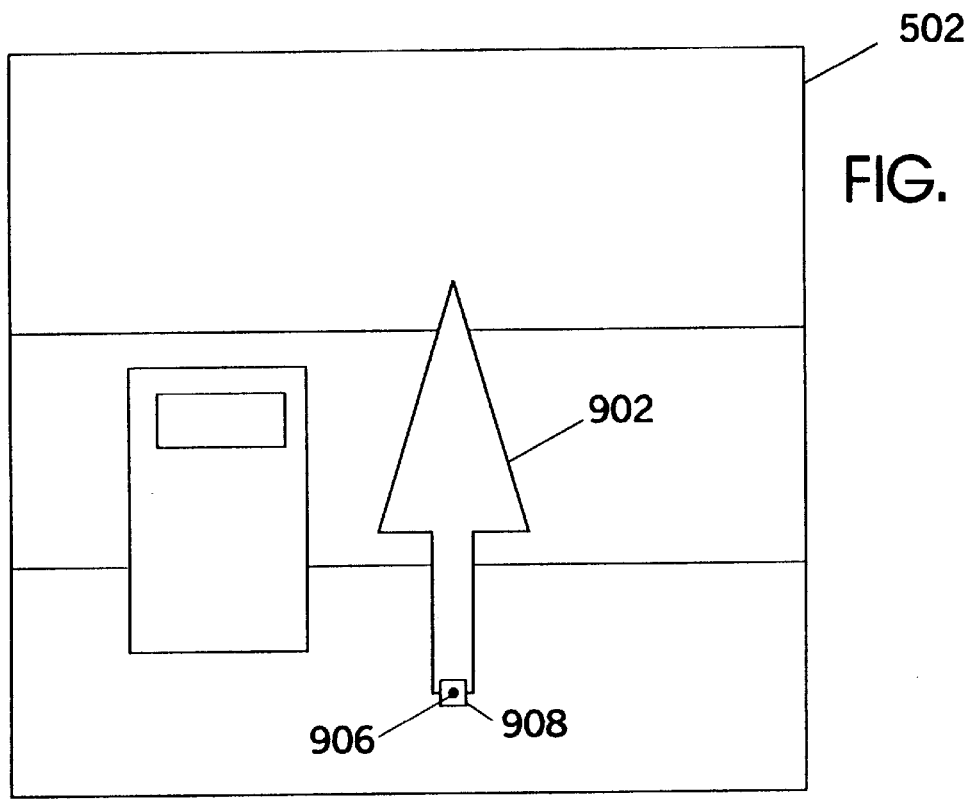
FIGS. 10A–10F depict the appearance of the display of FIG. 5 after figures based on FIG. 9 have been moved to various locations over the display of FIG. 5.
Figure 10B:
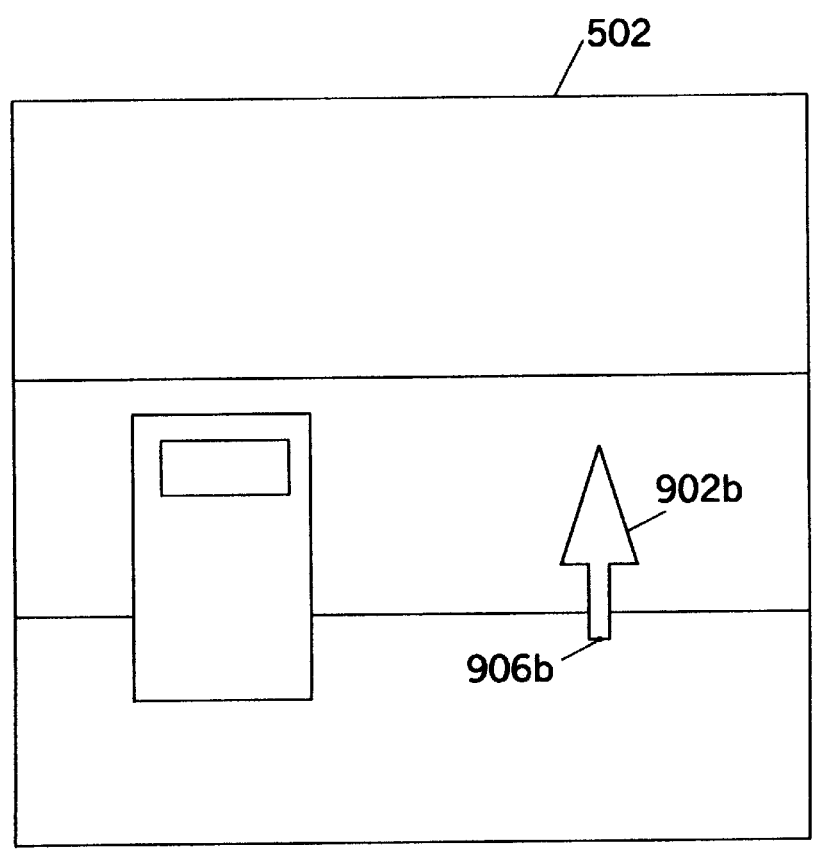

Using the procedure of FIG. 11, if the user moves the figure 902 from the position 902*a* depicted in FIG. 10A to a new position 902*b* (FIG. 10B), the procedure will obtain, as the scaling factor, the value from the corresponding pixel in map 701 (FIG. 7B). The value will be that stored as corresponding to the pixel and the scaling factor map 701 which is in the same relative location as the background pixel where the position pixel 906*b* of the figure 902*b* is now located. In this example, the pixel 906*b* is located in a region of the scaling factor map 701 having a value of 20. Thus, a smaller scaling factor will now be applied to the figure, resulting in display of a smaller figure as shown in FIG. 10B.

Figure 10C:
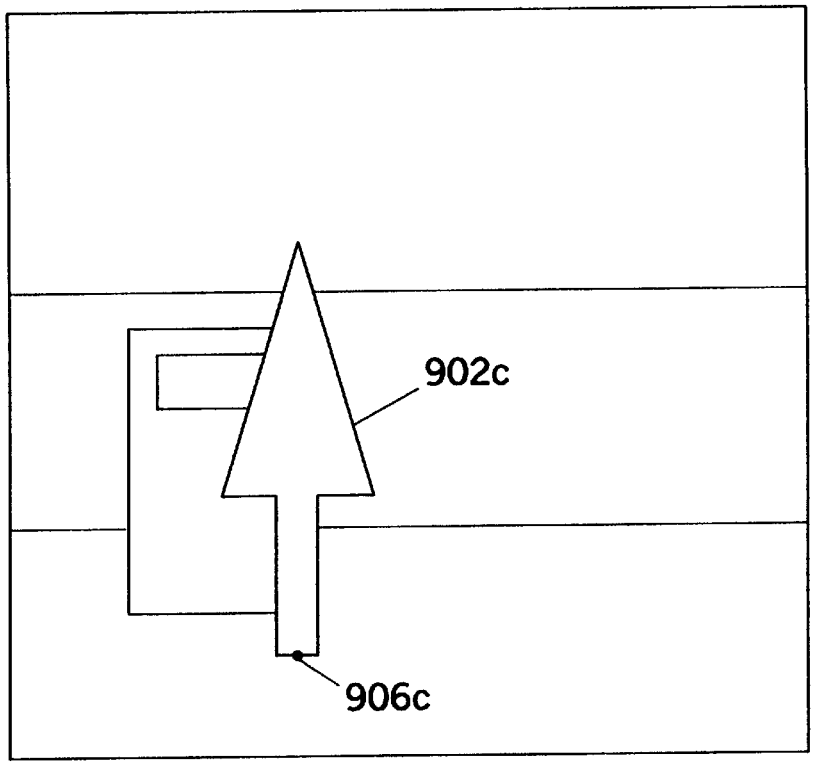

If the user uses a pointing device to move the figure from the position 902*a*, shown in FIG. 10A to the position 902*c* shown in FIG. 10C, the position pixel of the figure in the new position 902*c* is located in a position 906*c* which, consulting the value stored for the corresponding pixel of the scaling factor map 701, has the same value as the value used for scaling in FIG. 10A, and accordingly the figure 902*c* will have the same size in the position 902*c* shown in FIG. 10C as that shown in the position 902*a* in FIG. 10A. In this case, when the pixel-by-pixel comparison is made with the occlusion map (FIG. 8), once again the distance value assigned to the figure 902*c* (namely 25) is greater than the distance value assigned to the door 411 (namely 24). Thus the figure 902*c* will occlude corresponding background pixels which depict portions of the door 411 as shown in FIG. 10C.

Figure 10D:
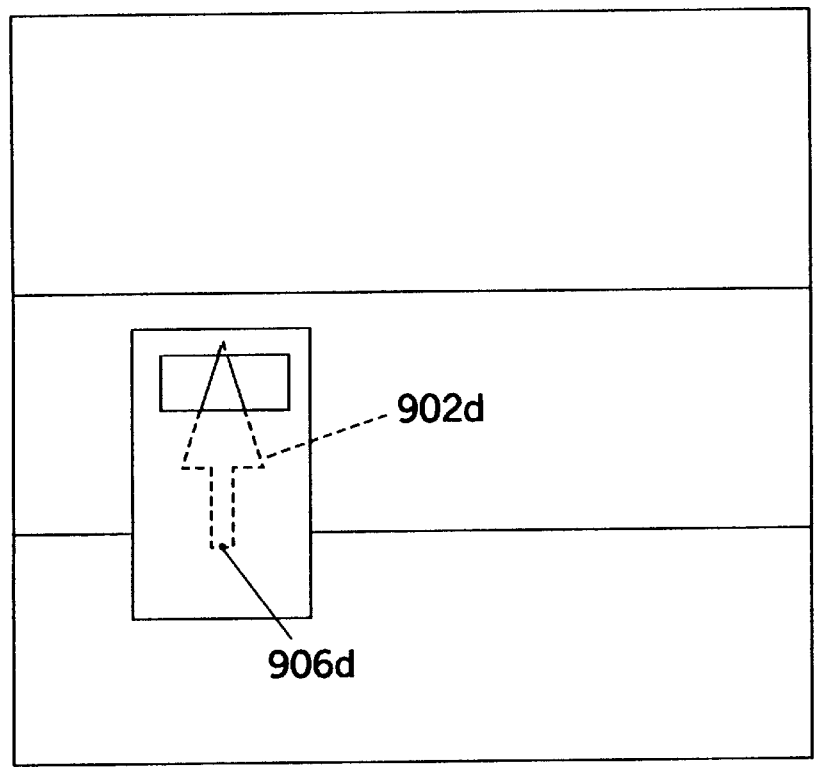

Returning to FIG. 10B, if the user employs the pointer device to move the figure laterally from the position 902*b* depicted in FIG. 10B such that the position pixel is located at the position 906*d* (FIG. 10D) consulting the scaling map 701 it is seen that there will be no change in scaling of the figure as it moves from the position 902*b* (FIG. 10B) to the position 902*d* (FIG. 10D). However, the distance factor assigned to the figure when located in this position 902*d* (namely 20) will be less than the value assigned to the door 411 in the occlusion map (FIG. 8) (namely 24), although it will be greater than the value assigned to the window region of the door (namely 5). Thus, portions of the figure 902*d* which are in line with the door 414 will be occluded by the door (shown in FIG. 10D, in phantom) although portions aligned with the window 416 will not be occluded by the window. Thus, as shown in FIG. 10D it will appear to the user as though the tree 902*d* is moved behind the door 414, but can still be partly seen through the window of the door 416.

Figure 10E:
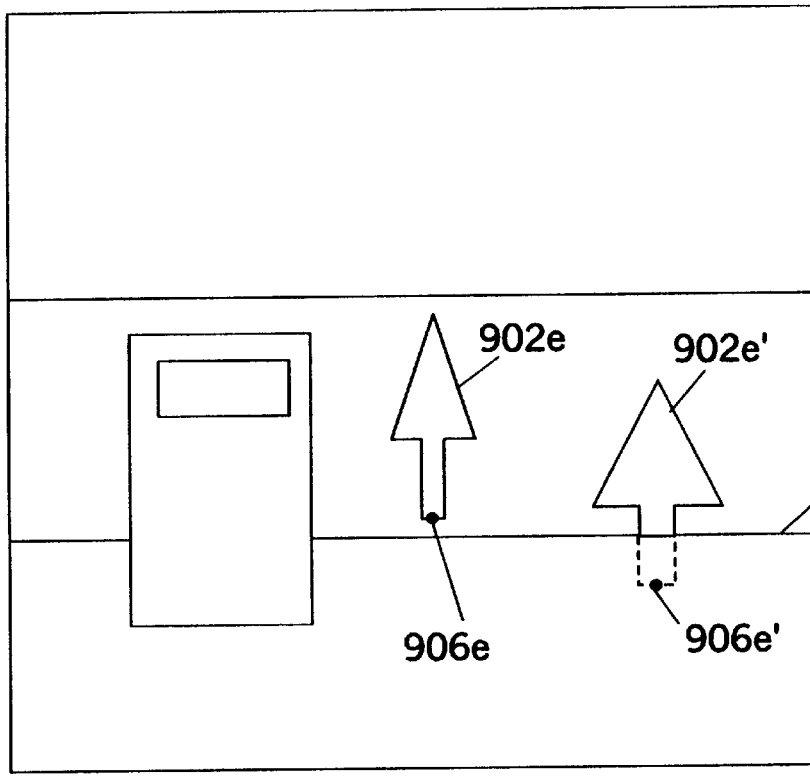

If the user uses the pointing device to move the figure above the ridgeline 408 (e.g. so that the position pixel 906 is positioned, for example, at the location 906*e*, the scaling and occlusion will proceed according to the procedure of FIG. 11. However, it is noted that, in this case, the position pixel 906*e* is located over a pixel of the background whose corresponding pixel in the scaling factor map 701 has a value of 0 (since it lies in region 708). This is an indication that map 701 is no longer the proper map to use. The procedure therefore returns to the index map (FIG. 6) and the value of the index map for this pixel 906*e* is 2. Therefore, the procedure will use scaling factor map 02 (702, FIG. 7C) until such time as there is another indication that a change of scaling map is called for. This change in scaling map is part of the procedure for permitting a figure to be positioned either in front of or partially behind a feature of the background depending on the direction from which it approached the feature. In the present example, approaching the ridgeline 408 from below is intended to correspond to movement of a figure up the three dimensional slope 404 of the conceptual three dimensional region (FIG. 4) while approaching the ridgeline 408 from above as in FIG. 10E is intended to indicate that the user wishes to pass the figure beyond (i.e. to a greater depth 402) the ridgeline 408 such that subsequent positions below the ridgeline 408 will correspond to locations on the downward slope 406 or gentle slope 410 and thus will result in a figure 902 which is at least partially occluded by the ridge 408. Thus, if the user used the pointing device to move the figure from the position 902*e* depicted in FIG. 10E to the position 902*e'*, the scaling will be performed as described above. However in this case the distance factor assigned to the figure 902*e'* will be obtained from scaling factor map 702 and, as seen from FIG. 7C will necessarily have a value which is less than the distance value of the initial slope 404 in the occlusion map (namely 20). Therefore portions of the figure 902*e'* which are in line with background pixels of the initial slope 404 will be occluded thereby (as shown by phantom lines in FIG. 10E) and portions above the ridgeline 408 will occlude the background. Thus, the configuration depicted and described herein provides a simulation of a 3-D region which includes occlusion characteristics.

In the procedure of FIG. 11, the index map is consulted to provide a change in scaling factor maps only when the figure has moved into an undefined (or zero value) area of the map that was formerly used. By checking the index map only under these conditions (i.e. not checking the index map every time the figure is moved) the desirable hysteresis effect of map selection is preserved, which permits figures to be moved selectively by the user in front of or behind certain background features, depending on the direction from which the feature is approached.

Figure 10F:
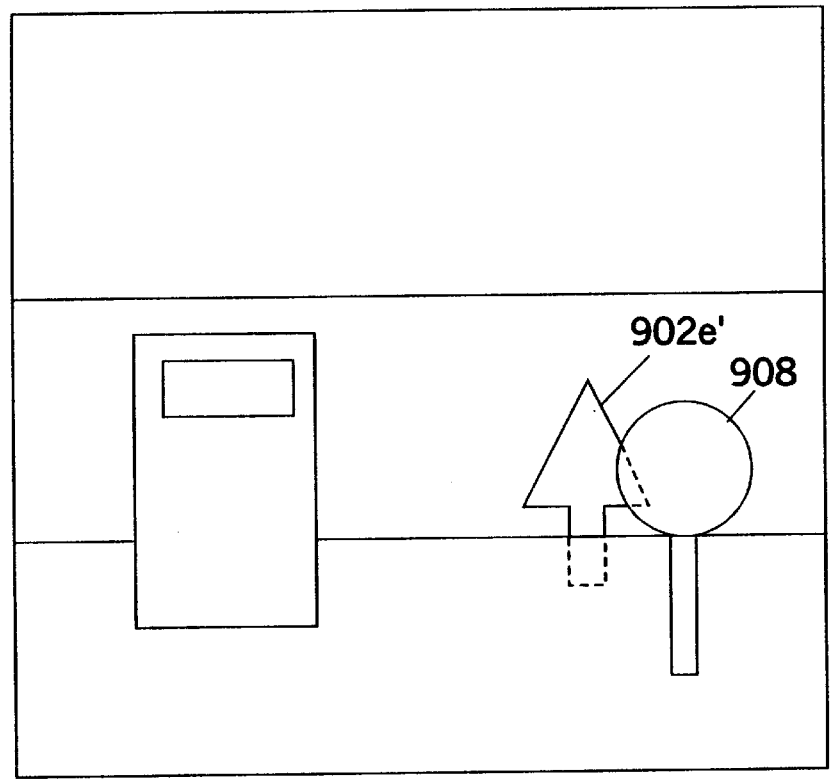

As shown in FIG. 10F, if the user next selects a different figure 908 and positions it over the background, the new figure can be occluded or can occlude not only features of the background, but also previously-positioned figures such as 902e', as shown. This is possible because, as noted above, once 902e' is positioned, it will be included as part of the occlusion map (FIG. 8) to form a basis on which other features can occlude or be occluded by the positioned figure.

FIG. 12 depicts scanned images of the appearance of computer display 1202 in one embodiment of the invention intended to include or encourage narration or story-telling skills. In the example of FIG. 12, a background scene 1204 is displayed. The background scene may correspond to numerous partially overlapping scaling factor maps, depending on how complicated the background scene is. The user is provided with a palette display 1206 from which the user can select multiple types amd examples of figure 1208 and can use a pointer device to drag these figures for placement, with automatic sizing and occlusion (as described above) onto the background scene 1204. In one embodiment, the user is also permitted to position a text area 1209 (which may be fancifully configured, in this case to resemble a shell) and may be permitted to type narration or other text into the text area. The user can save the image and can define multiple images to be indexed or sequenced as a plurality of pages which can be viewed, in order if desired, and/or printed to create a printed or electronic illustrated book.

In one embodiment, a package of different items is provided which permits flexibility of use. For example, in one embodiment the package would contain a plurality of different background scenes to allow the user to select a desired background scene (or a portion thereof) and a plurality of different sets of figures to allow the user to select among desired figures for placing over the background scene. The data representing the background scene, the associated maps (index map, scaling factor maps, occlusion map, restoration map) are, preferably, provided in the package as separate graphic image files, stored in a compressed or packed format. The program for performing appropriate procedures for displaying in response to user input, e.g. as described generally in connection with FIG. 11, is also provided as part of the package. Typically, a user would obtain the package on a magnetic or optical medium such as one or more floppy disks, compact disks (CD-ROMs), and/or would download the appropriate files from a data source, e.g. from a server on a local area network, from a source on the Internet, etc. Typically, in use, the program would be loaded, e.g. from the computer's hard drive into memory and, in response to user input, the program would access and unpack, is necessary, background and/or map files for use, e.g. according to the procedure depicted in FIG. 11. Thus, at any one time, the various components of the package may reside on a computer's hard drive, on a floppy disk, on a CD-ROM, and/or in the computer's random access memory (RAM).

Figure 13A:
FIGS. 13A–13P depict scanned images of a background scene, associated data or maps and portions of a display that may result from use of the scene and maps.
Figure 13C:
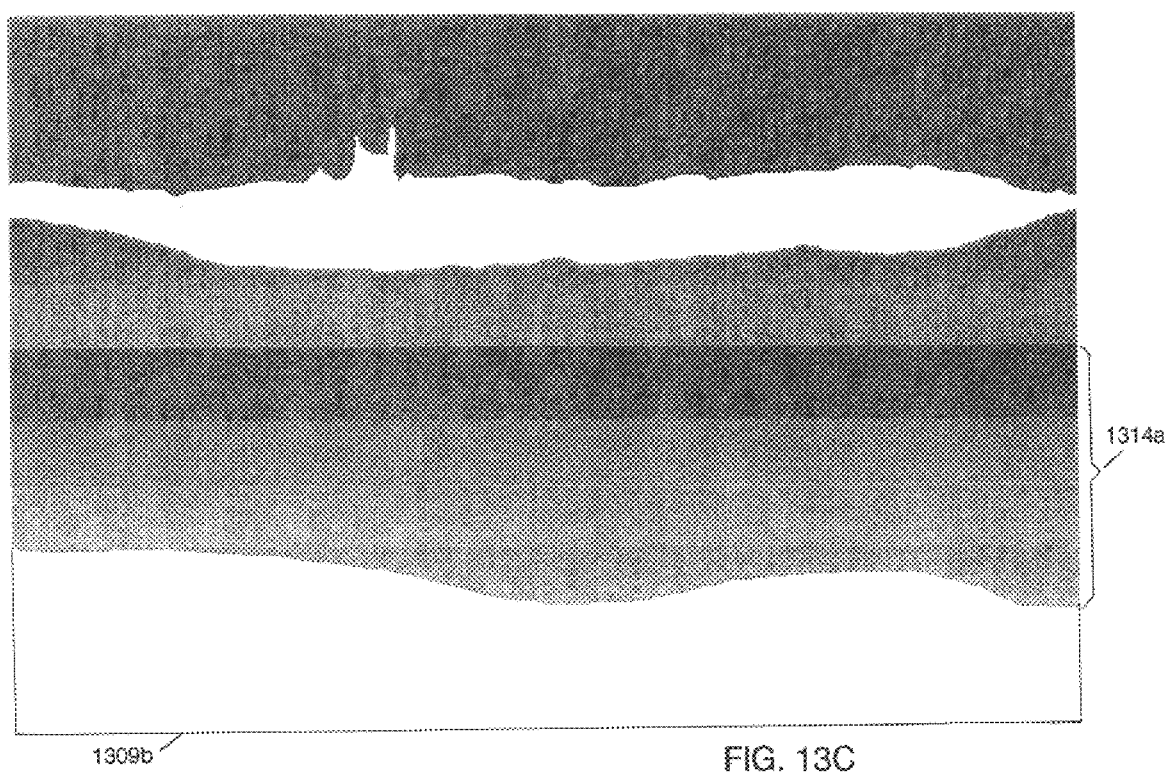
Figure 13D:
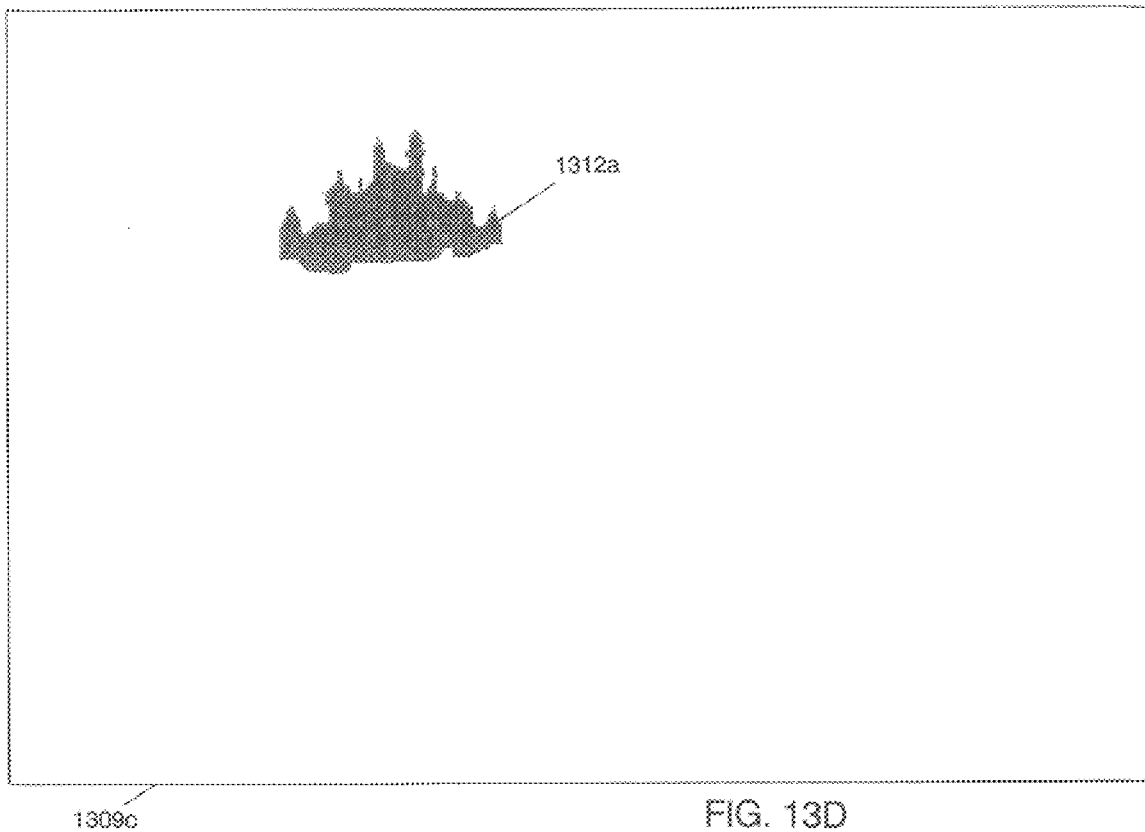
Figure 13E:
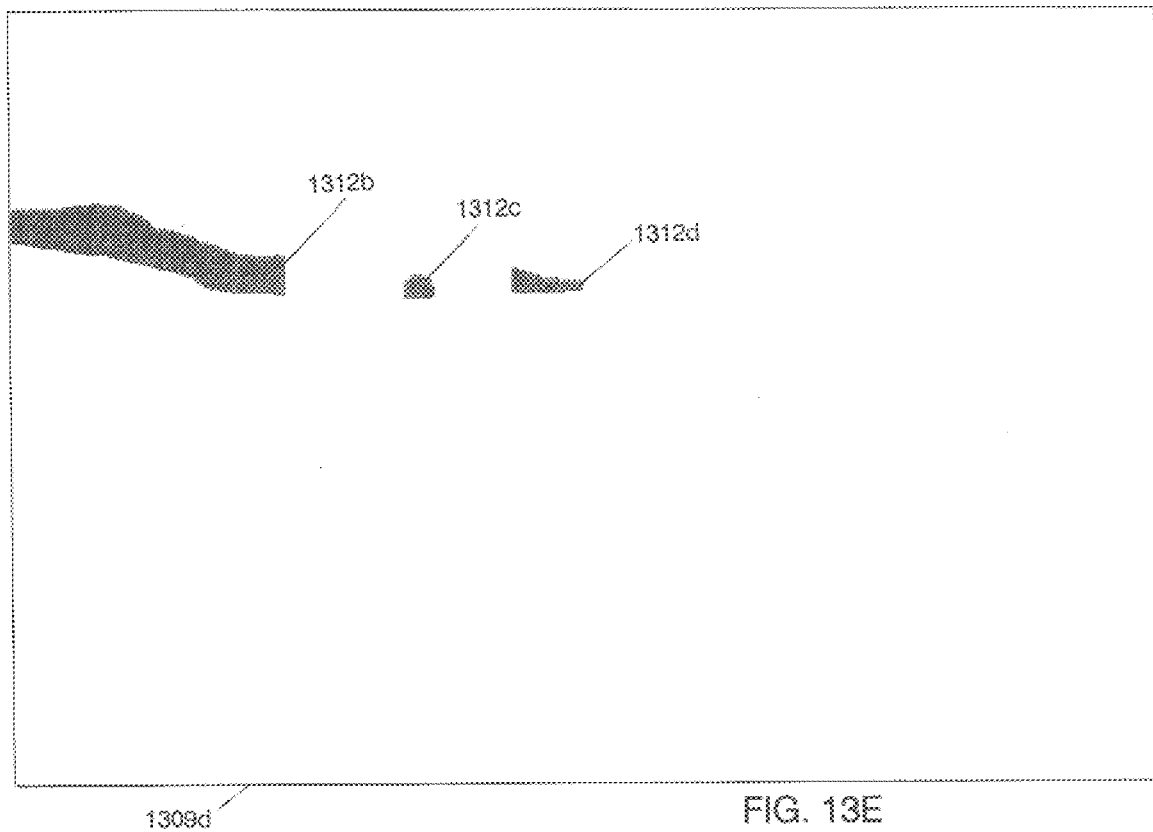
Figure 13F:
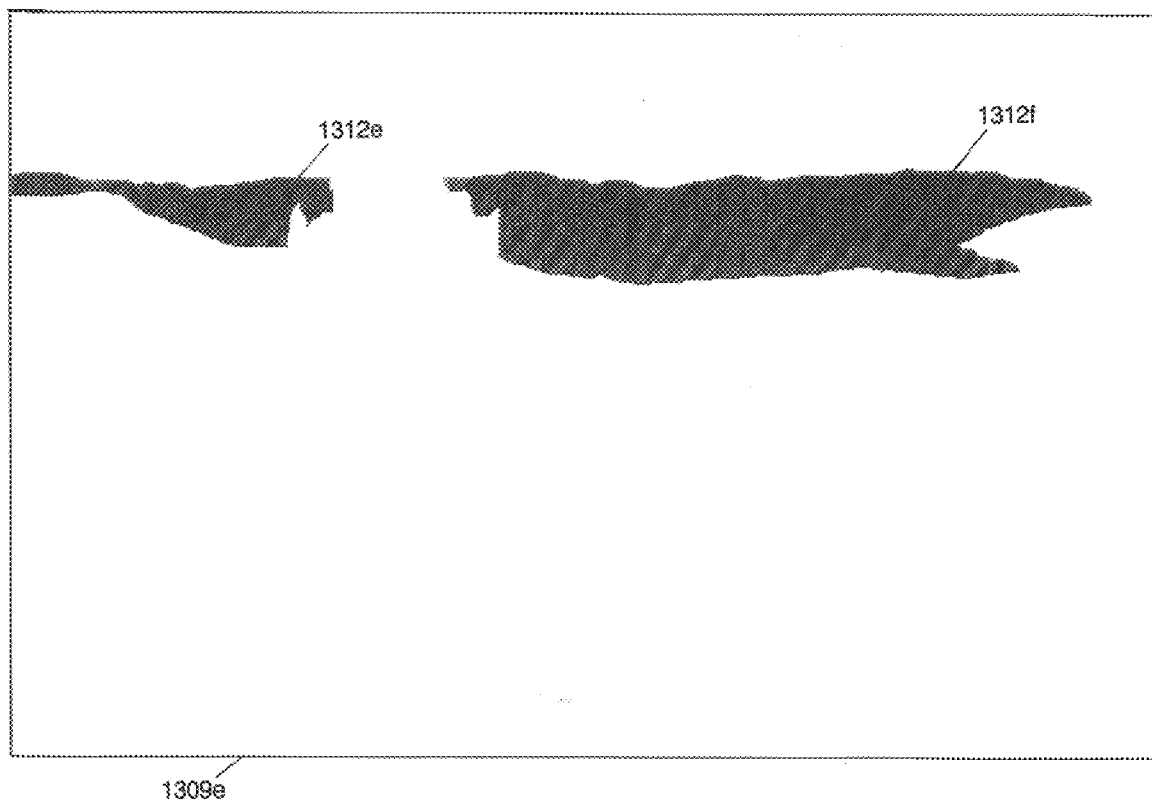
Figure 13G:
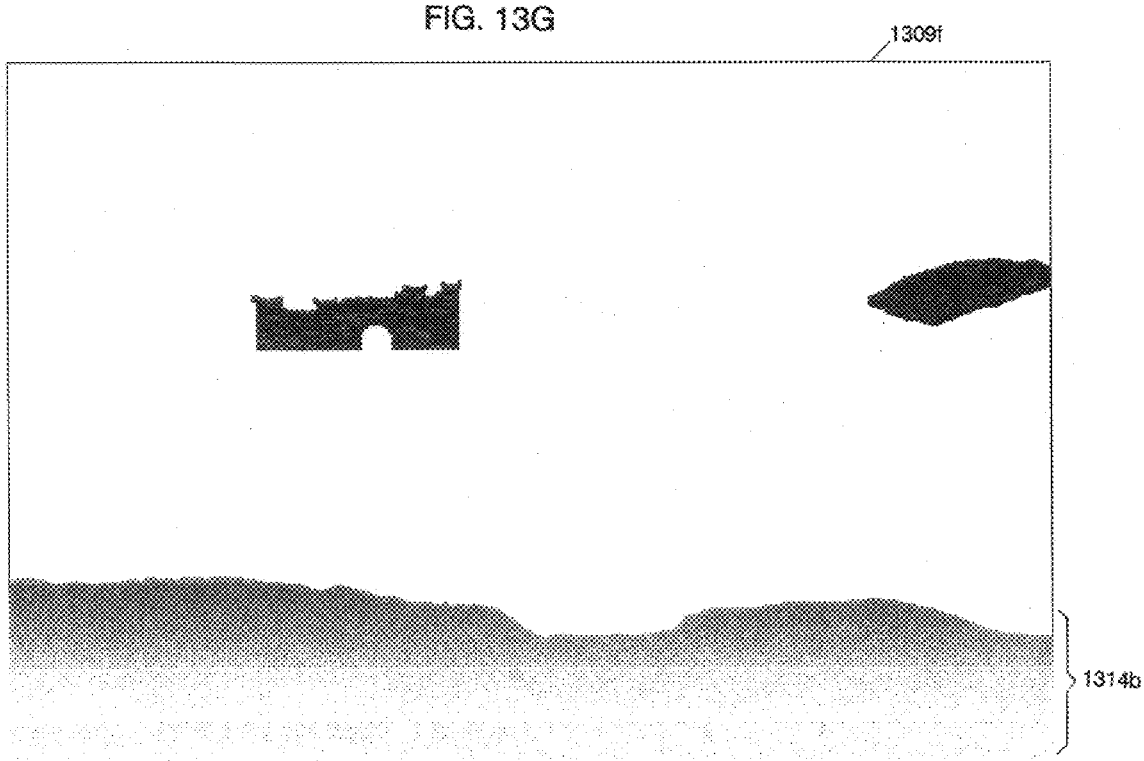
Figure 13H:
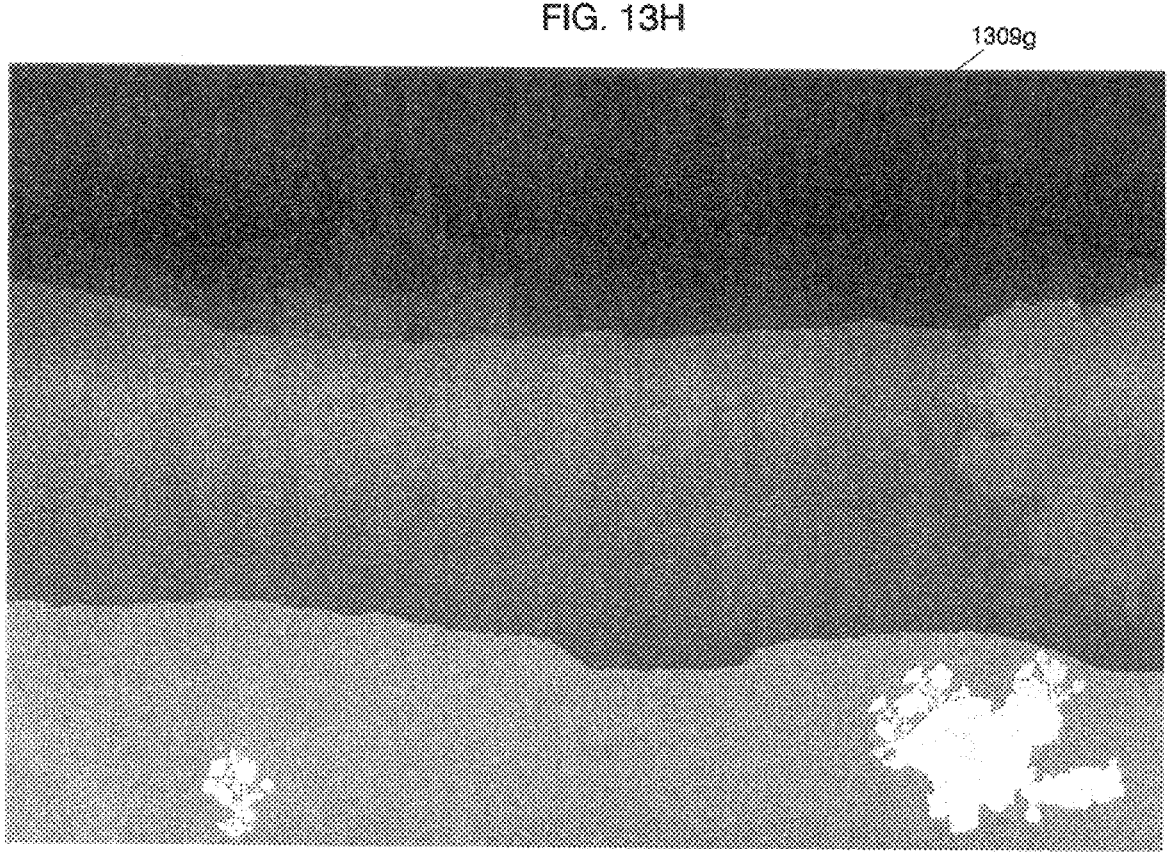
Figure 13L:
Figure 13M:
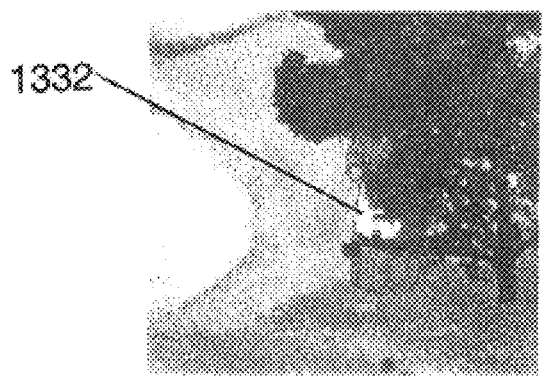
Figure 13N:
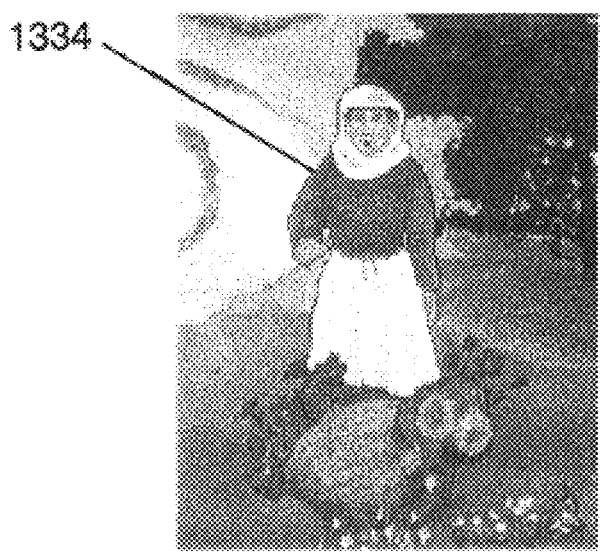
Figure 13O:
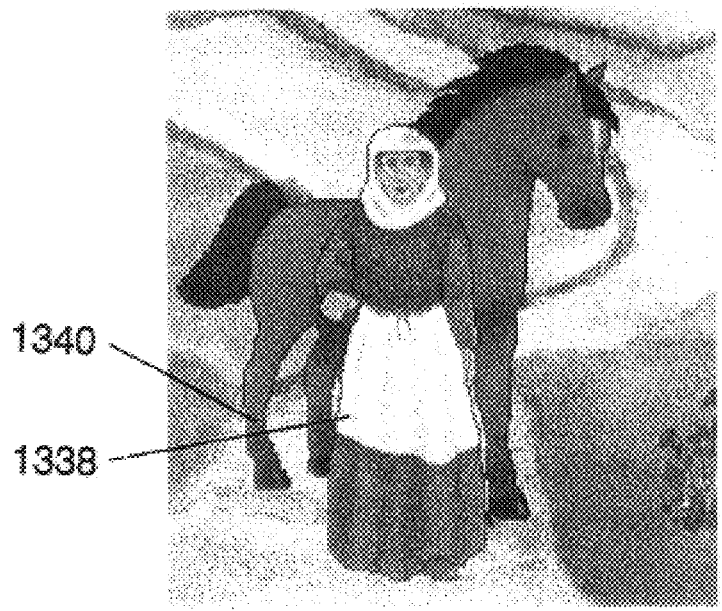
Figure 13P:
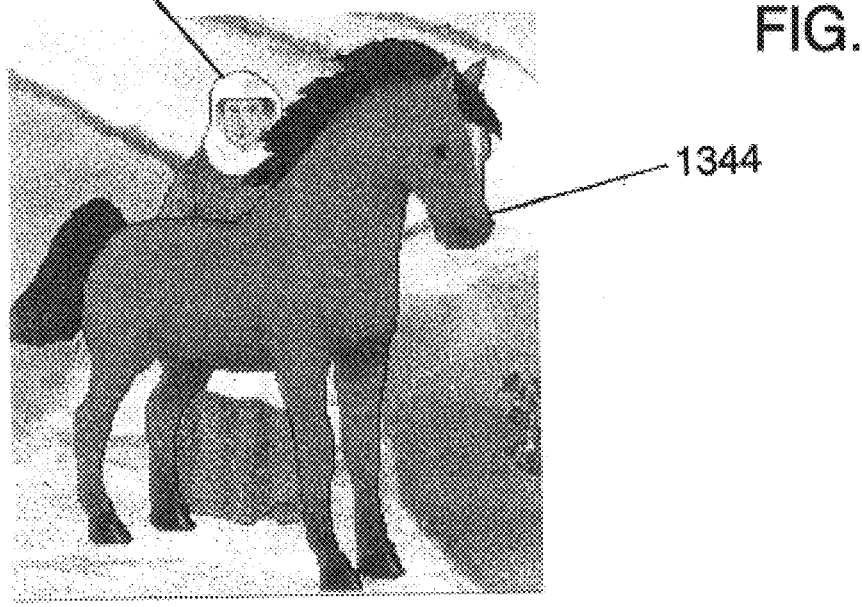

FIGS. 13A–13P depict scanned images of an example of images and figures used and/or positioned according to an embodiment of the present invention and index, scaling factor and occlusion maps associated therewith. FIG. 13A shows an example of a background as it would appear on a computer screen. FIG. 13A includes at least two ridgeline areas 1302 1304, a tree 1306 and a region of rocks and flowers 1307, as well as other features, behind which one or more figures may be placed.

FIG. 13B depicts the index map 1309a associated with the background of FIG. 13A. FIGS. 13C–13G depict scaling factor maps 1309b,c,d,e,f. As discussed above, the index map can be used to determine which scaling factor map to employ for determining scaling factors at a particular location. In the depiction of FIG. 13B, different colors are used to represent different values associated with the various pixels. As noted above, these values are conveniently stored as a color graphic format and thus the data can be conveniently output in the fashion shown in FIGS. 13B–13H, using different colors to depict different numerical values. Also, the various maps can be created using computer graphics software and tools.

In the depiction of FIG. 13B, first regions 1310a, 1310b are red in such a depiction, corresponding to a value of 01 and thus indicating use of scaling factor map 01 (FIG. 13C). A second region 1310c is, in this fashion, colored green corresponding to a value of 02 and thus indicating use of scaling factor map 2 (FIG. 13D). Region 1310d is depicted in purple corresponding to a value of 03 and indicating use of scaling factor 03 (FIG. 13E). Region 1310e is, in this fashion, depicted in yellow corresponding to value of 04 and indicating use of scaling factor map 04 (FIG. 13F). Regions 1310f are, in this fashion, depicted in blue corresponding to a value of 05 and indicating use of scaling factor map 05 (FIG. 13G). The values stored for the various pixels in each scaling factor map (FIGS. 13C–13G) will be assigned depending on the behavior desired for figures in this particular scene. In some maps (FIG. 13D, FIG. 13E, FIG. 13F) regions 1312a have a single value throughout those regions while the remainder of the pixels (depicted, in these figures, by white area) have a value of 0 indicating no valid scaling factor in this region of this map. In other maps, certain regions 1314a, 1314b have values which vary across the region typically in a monatomic fashion. As depicted, there may be overlap between regions on various scaling factor maps such that a given pixel may have a value on more than one scaling factor map and thus the non-zero (non-white) regions of the various maps may overlap with one another (e.g. regions 1314a and 1314b), as described above.

FIG. 13H depicts an occlusion map 1309g for use in connection with the scene of FIG. 13A. As described above, the values for the various pixels on the occlusion map (corresponding to different colors in the depiction of FIG. 13H, as described above) are used to determine whether a figure should be drawn over features of the background or not. As described above, as figures are positioned by the user over the background scene, regions of the occlusion map (FIG. 13H) will be updated to reflect the position of the figure and assigned a value equal to the scaling factor assigned to that figure in that position (and thus would be shown in the depiction according to FIG. 13H in a solid color).

FIG. 13I depicts a portion of the background scene of FIG. 13A with a figure 1322 positioned with respect to the background. If the user moves the figure 1322 upward on the screen, the figure will automatically re-size to a smaller size 1324 (FIG. 13J) to simulate foreshortening. Movement even further up the screen will result in further foreshortening 1326 (FIG. 13K). If the figure is moved downward from the position shown in FIG. 13J below the ridgeline 1302, the figure will be partially occluded by the ridgeline 1328 (FIG. 13L). However, if the same figure had approached an identical position by being moved upward from the bottom of the scene, the figure would not be partially occluded by the ridge 1302 and, instead, would appear to be positioned on the slope in front of the ridge (rather than behind the ridge as shown in FIG. 13L). If the figure is moved above the imaginary horizontal line passing through the intersection of the tree trunk with the ground 1330 and thereafter moved towards the tree 1306, the figure will be partially occluded by the tree 1332 (FIG. 13M). If, however, the figure is moved to a position such that it is located (or more precisely, its position pixel is located) below the trunk/ground intersection location 1330, the figure will partially occlude the tree 1334 (FIG. 13N) even though the figure 1334 may itself be occluded by features which are even "closer" in the foreground such as the rock and flowers 1336. If a user uses a pointer device to bring a second figure in the vicinity of the first figure, the two figures will interact such that the one which is more in the foreground (typically the one with a position pixel which is lower on the screen 1338) will at least partially occlude the second figure 1340 (FIG. 13O). The user may, by moving the figures, reverse the relative occlusion between figures 1342, 1344 (FIG. 13P). In changing the display from the display as shown in FIG. 13O to the display as shown in FIG. 13P, the first figure 1338, 1342 was not moved. Only the second figure 1340, 1344 was moved, in this case, downward on the screen, to create an illusion of three-dimensionality, e.g. by occlusion.

In some cases, it is desirable to recognize a need to switch to a different scaling factor map using the criterion other than (or in addition to) placement of the figures position pixel over a zero-value pixel. This is because, for some types of backgrounds, it may be desired to switch to a different scaling factor map before the position pixel is moved to a zero-value. One such alternate or additional criterion is whether the figure (or the figure bounding box) has moved entirely into a new region of the index map (i.e. into region(s) having a different value(s) than the currently used scaling factor map). In one embodiment a check is performed after the user releases the button 1122. To perform this check rigorously, the pixel value of the index map for every pixel on the perimeter of a bounding box 904 of a figure is checked to determine whether there is at least one such pixel value which is equal to the number of the scaling factor map currently being used. If desired, in order to provide for more rapid execution, a less rigorous test can be performed, e.g. by checking every Nth pixel around the perimeter of the bounding box. N may have any of a number of values. In one embodiment N=8. If there is not at least one pixel with this value, a new scaling factor map is selected, e.g. by finding the value on the index map where the position pixel is located, or finding the value on the index map which is numerically closest to the last-user value.

The present invention can be used in connection with a number of types of computing devices including 486-microprocessor based devices, Macintosh computers and the like. In one embodiment, the present invention is used in connection with a 486, Pentium™ or similar microprocessor based computer having at least about 8 megabytes of memory. In one embodiment, a math coprocessor is not required to effectively perform the process and the use of a math coprocessor does not significantly accelerate performance of the procedure.

In light of the above description, a number of advantages of the present invention can be seen. The present invention permits use of a computer to control a display which can provide a two dimensional image which simulates a three dimensional environment, including simulation of three dimensional features or characteristics such as foreshortening and occlusion, without incurring the large computational load required for certain previous simulations of three dimensional regions. By reducing the computational load, simulation of three dimensional regions becomes available to a wider range of users, i.e. users who have access only to medium or low-level computers. The invention can be used in connection with, e.g., learning software to encourage and facilitate creativie activities such as story-telling, narration, drawing as well as providing an easy to use, low-cost and low-computing load device and method for providing multimedia production simulating three dimension al regions. The present invention, since it does not require the creation of three-dimensional art, can make effective use of personnel, programming and other tools which are oriented toward the creation of two-dimensional scenes and art, thus reducing the need for re-training and/or the need for new programs or other tools.

A number of variations and modifications of the present invention can be used. It is possible to use some aspects of the invention without using others. For example, it is possible to provide for foreshortening without providing occlusion, and vice versa. Although the storage of data as two dimensional arrays in a graphic format has been described, data can be stored in other fashions, such as indexed numerical arrays of data, as will be well known to those skilled in the art. Although a particular procedure has been described for implementing the present invention, variations and modifications to the procedure can also be used, such as providing for adding the figure to the occlusion map every time the figure is moved to a new pixel location (rather than waiting for the button to be released). Preferably the user is permitted to select from among a plurality of different backgrounds, with the associated index, scaling factor and occlusion maps being automatically loaded and ready for use as described. Although, in general, it is desired to provide one scaling factor map for each part of the scene that a sticker can go behind, it is possible to reduce the number of scaling factor maps by combining two or more scaling factor maps, e.g. when there are two items which a figure can go behind in two separate regions of the background. Although in the above description, a single scaling factor is assigned to a figure, depending on the location of its position pixel, it would also be possible to provide for a scaling factor which varied across the surface of the figure, e.g. if it was desired to provide a figure which had different regions which scaled differently, or to provide for a figure which had different regions with different occlusion properties (since, in one embodiment, the scaling factor for a figure is used in determining occlusion characteristics). In some situations there may be two or more backgrounds which can share scaling factor maps, if they have sufficiently similar features or if lower performance can be tolerated. Rather than using a pixel by pixel storage of values for each pixel of the background, it would be possible to define scaling factor index values and/or distance values associated with background features and/or figures by, e.g., assigning a single value to each feature or figure and storing a list of values or storing a set of parameters for use in calculating values using a formula. It would be possible to provide an embodiment in which figures were not included in the occlusion map (and thus did not provide for control of the occlusion of one figure with respect to another). Although this would in general provide for a lowering of performance, this may be acceptable in some contexts (e.g. on machines with limited memory), such as when there are few figures positioned on a background. This would, however, make it possible to use the occlusion map in a compressed or packed format, i.e. it would not be necessary to unpack or uncompress the data in order to use it, yielding more rapid execution and requiring less memory. In this variation it might be possible to still provide for some occlusion of one figure with respect to another, e.g. by checking the perimeter of each figure to determine whether there was an overlap with the perimeter of another figure. In one embodiment, rather than scaling each figure as needed, it would be possible to store a plurality of pre-scaled figures, selecting the figure with the desired scale as needed. This, however, may require a relatively large amount of memory.

Although the invention has been described by way of a preferred embodiment and certain variations and modifications, other variations and modifications can also be used, the invention being defined by the following claims.

What is claimed is:

1. A computer-implemented method of displaying a simulated three-dimensional scene without performing three-dimensional rendering, comprising:

storing first computer-readable data representative of the display of a background scene defining a plurality of locations, said background scene corresponding to a two-dimensional array of pixels;

storing second computer-readable data representative of at least a first figure;

storing third computer-readable data for providing a plurality of scaling factors associated with at least some of said locations, said step of storing said third computer-readable data includes storing (1) a first set of scaling factors corresponding to a first plurality of said pixels, and (2) storing a second set of scaling factors corresponding to a second plurality of said pixels, wherein there is at least one pixel common to said first and second pluralities of pixels;

receiving, in a computer, user input indicating a location on said background scene at which said user wishes to position said figure;

displaying, under computer control, an image which is the combination of a first image of at least a portion of said background scene with a second image of at least a portion of said figure, wherein said second image is scaled by a scaling factor which is selected from said plurality of scaling factors in response to said location indicated by said user input and wherein said image is located, with respect to said background scene, substantially near said location indicated by said user input.

2. A method, as claimed in claim 1, futher comprising:

storing third data computer-readable data for providing a plurality of location depth values representative of at least some of said locations;

determining, in said computer, a figure depth value for at least a portion of said figure related to said location indicated by said user;

comparing, in said computer, said figure depth value with at least one location depth value;

wherein said step of displaying includes displaying said image, wherein at least said a first portion of said figure is displayed only if said figure value has a first relational value with respect to a location depth value representative of said region indicated by said user input.

3. A computer-implemented method of displaying a simulated three-dimensional scene without performing three-dimensional rendering, comprising:

storing first computer-readable data representative of the display of a background scene defining a plurality of locations;

storing second computer-readable data representative of at least a first figure;

storing third data computer-readable data for providing a plurality of location depth values representative of at least some of said locations wherein data corresponding to at least a first region of said background scene includes first and second different depth values;

receiving, in a computer, user input indicating that said user wishes to position said figure in a location at least partially overlapping said region of said background scene;

determining, in said computer, a figure depth value for at least a portion of said figure related to said location indicated by said user, wherein said figure depth value is between said first and second different depth values;

displaying, under computer control, an image which is the combination of a first image of at least a portion of said background scene with a second image of at least a portion of said figure, wherein at least a portion of said figure occludes at least portions of said background which are associated with said first depth value and wherein at least portions of said region of said background which are associated with said second depth value occlude at least portions of said figure, to provide an image in which said figure appears dimmed.

4. A method, as claimed in claim 3, wherein at least a portion of said third data includes said first and second values substantially in a checkerboard distribution.

5. A computer implemented method of providing a display with foreshortening and occlusion characteristics in response to input form a user, the method comprising:

storing, on a computer-readable medium, a data array having a plurality of elements, each element indicating a color for a corresponding one of a first plurality of pixels of a first two-dimensional scene;

storing, on a computer-readable medium, a second data array having a plurality of elements, each element indicating a scaling factor, said plurality of elements of said second data array corresponding to at least a first sub-set of said first plurality of pixels;

storing, on a computer-readable medium, a third data array having a plurality of elements, each element indicating a scaling factor, said plurality of elements of said third data array corresponding to at least a second sub-set of said first plurality of pixels;

storing, on a computer-readable medium, a fourth data array having a plurality of elements, each element indicating the use of either said first data array or said second data array, said plurality of elements of said fourth data array corresponding to at least a sub-set of said first plurality of pixels;

storing, on a computer-readable medium, a fifth data array, having a plurality of elements, each element indicating an occlusion value, said plurality of elements of said fifth data array corresponding to at least a sub-set of said first plurality of pixels;

storing, on a computer-readable medium, a sixth data array having a plurality of elements, each element indicating a color for a corresponding one of a second plurality of pixels of a first two-dimensional figure, one of said second plurality of pixels being designated as a first position pixel;

storing, on a computer-readable medium, a seventh data array having a plurality of elements, each element indicating a color for a corresponding one of a third plurality of pixels of a second two-dimensional figure, one of said third plurality of pixels being designated as a second position pixel;

displaying, under computer control, a first image including said first two-dimensional scene by displaying a color, for each of said first plurality of pixels, indicating by the element of said first data array corresponding to said pixel;

receiving, in a computer, user input indicating a first of said first plurality of pixels where said user wishes to place said first position pixel, to define a first selected pixel;

selecting one of said second and third data arrays as a selected scaling factor array depending on the value of the element of said fourth array corresponding to said first selected pixel;

scaling said first figure to provide a first scaled figure having a size related to a first selected scaling factor, said first selected scaling factor being the scaling factor indicated by the element of said selected scaling factor array corresponding to said first selected pixel, said first scaled figure having a fourth plurality of pixels, and including said first position pixel;

defining a third sub-set of said first plurality of pixels, said third sub-set of pixels being those pixels of said first plurality of pixels which would be occupied by said first scaled figure if said first scaled figure were positioned over said first two-dimensional scene with said first position pixel positioned over said first selected pixel;

displaying, under computer control, a second image which includes pixels from the first two-dimensional scene for those pixels which are different from said third sub-set of pixels, and which includes, for each pixel in said third sub-set of pixels, the corresponding pixel of said first two-dimensional scene only if said first selected scaling factor is greater than the occlusion value indicated by the element of said fifth data array corresponding to said each pixel, and which otherwise included the corresponding pixel from said fourth plurality of pixels;

modifying those elements of said fifth data array which correspond to said third sub-set of pixels, to indicate an occlusion value equal to said first selected scaling factor;

receiving, in a computer, user input indicating a second of said first plurality of pixels where said user wishes to place said second position pixel, to define a second selected pixel;

obtaining a second selected scaling factor, said second selected scaling factor being the scaling factor indicated by the element of said selected scaling factor array corresponding to said second selected pixel, if said second selected scaling factor equals zero, selecting one of said second and third data arrays as a selected scaling factor array depending on the value of the element of said fourth array corresponding to said second selected pixel, and repeating said step of obtaining a second selected scaling factor;

scaling said second figure to provide a second scaled figure having a size related to said second selected scaling factor, said second scaled figure having a fifth plurality of pixels, and including said second position pixel;

defining a fifth sub-set of said first plurality of pixels, said fifth sub-set of pixels being those pixels of said first plurality of pixels which would be occupied by said second scaled figure if said second scaled figure were positioned over said first two-dimensional scene with said second position pixel positioned over said second selected pixel;

displaying, under computer control, a third image which includes pixels from said second image for those pixels which are different from said fifth sub-set of pixels, and which includes, for each pixel in said fifth sub-set of pixels, the corresponding pixel of said second image only if said second selected scaling factor is greater than the occlusion value indicated by the element of said fifth data array corresponding to said each pixel, and which otherwise includes the corresponding pixel from said fifth plurality of pixels.

* * * * *